US011425382B2

United States Patent
Yoshikawa et al.

(10) Patent No.: US 11,425,382 B2
(45) Date of Patent: *Aug. 23, 2022

(54) ENCODING METHOD, DECODING METHOD, ENCODING APPARATUS, AND DECODING APPARATUS

(71) Applicant: Panasonic Intellectual Property Management Co., Ltd., Osaka (JP)

(72) Inventors: Satoshi Yoshikawa, Hyogo (JP); Takahiro Nishi, Nara (JP); Kengo Terada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,167

(22) Filed: Apr. 15, 2021

(65) Prior Publication Data

US 2021/0235087 A1    Jul. 29, 2021

Related U.S. Application Data

(63) Continuation of application No. 15/539,418, filed as application No. PCT/JP2015/005104 on Oct. 8, 2015, now Pat. No. 11,012,693.

(30) Foreign Application Priority Data

Dec. 26, 2014 (JP) .............................. JP2014-266311
Aug. 31, 2015 (JP) .............................. JP2015-171063

(51) Int. Cl.
*H04N 11/02* (2006.01)
*H04N 19/124* (2014.01)
(Continued)

(52) U.S. Cl.
CPC ......... *H04N 19/124* (2014.11); *H04N 19/126* (2014.11); *H04N 19/136* (2014.11);
(Continued)

(58) Field of Classification Search
CPC .. H04N 19/124; H04N 19/126; H04N 19/136; H04N 19/154; H04N 19/159; H04N 19/176; H04N 19/46
(Continued)

(56) References Cited

U.S. PATENT DOCUMENTS 11,012,693 B2 *  5/2021  Yoshikawa .......... H04N 19/159
2008/0089410 A1  4/2008  Lu et al.
(Continued)

FOREIGN PATENT DOCUMENTS

JP    2006-217145    8/2006
JP    2007-520165    7/2007
(Continued)

OTHER PUBLICATIONS

International Search Report dated Dec. 28, 2015 in International (PCT) Application No. PCT/JP2015/005104.
ITU-T H.265, "High efficiency video coding", Apr. 2013.

*Primary Examiner* — Jayanti K Patel
*Assistant Examiner* — Richard B Carter
(74) *Attorney, Agent, or Firm* — Wenderoth, Lind & Ponack, LLP.

(57) ABSTRACT

An encoding method which allows reduction in the amount of codes is provided. The encoding method includes: setting step S11 for setting a quantization matrix set; quantization step S12 for performing quantization on a target block using the selected quantization matrix; and encoding step S13 for encoding, in a mutually associated manner, the target block which has been subjected to the quantization and identification information for identifying the quantization matrix set which has been set. In setting step S11, a quantization matrix set selected from a plurality of quantization matrix sets is set as the quantization matrix set to be used to perform the quantization on the target block, the plurality of quantization matrix sets including a custom quantization matrix set which (Continued)

is arbitrarily specified and a plurality of defined quantization matrix sets which have been respectively defined in advance.

10 Claims, 31 Drawing Sheets

(51) Int. Cl.
    *H04N 19/176*      (2014.01)
    *H04N 19/126*      (2014.01)
    *H04N 19/154*      (2014.01)
    *H04N 19/159*      (2014.01)
    *H04N 19/46*      (2014.01)
    *H04N 19/136*      (2014.01)

(52) U.S. Cl.
    CPC ......... *H04N 19/154* (2014.11); *H04N 19/159* (2014.11); *H04N 19/176* (2014.11); *H04N 19/46* (2014.11)

(58) Field of Classification Search
    USPC ...................................... 375/240.03
    See application file for complete search history.

(56) References Cited

U.S. PATENT DOCUMENTS

| | | |
|---|---|---|
| 2009/0010559 A1 | 1/2009 | Inagaki |
| 2009/0034612 A1 | 2/2009 | Zheng |
| 2014/0072037 A1* | 3/2014 | Sato ................. H04N 19/115 |
| | | 375/240.03 |
| 2015/0334396 A1 | 11/2015 | Lim |
| 2016/0212429 A1 | 7/2016 | Ichigaya |

FOREIGN PATENT DOCUMENTS

| | | | |
|---|---|---|---|
| WO | 2005/076614 | 8/2005 | |
| WO | 2006/098226 | 9/2006 | |
| WO | 2013/089264 | 6/2013 | |
| WO | WO-2013089264 A1 * | 6/2013 | ........... H04N 19/463 |

\* cited by examiner

FIG. 4

QUANTIZATION MATRIX SET

FIRST QUANTIZATION MATRIX
(FOR 4 × 4 SIZE)

$$\begin{bmatrix} 16 & 16 & 16 & 16 \\ 16 & 16 & 16 & 16 \\ 16 & 16 & 16 & 16 \\ 16 & 16 & 16 & 16 \end{bmatrix}$$

SECOND QUANTIZATION MATRIX
(FOR 8 × 8 SIZE OR LARGER,
FOR INTRA PREDICTION)

$$\begin{bmatrix} 16 & 16 & \cdots & 21 & 24 \\ 16 & 16 & & 22 & 25 \\ \vdots & & \ddots & & \vdots \\ 21 & 22 & & 70 & 88 \\ 24 & 25 & \cdots & 88 & 115 \end{bmatrix}$$

(8 × 8 ELEMENT MATRIX)

THIRD QUANTIZATION MATRIX
(FOR 8 × 8 SIZE OR LARGER,
FOR INTER PREDICTION)

$$\begin{bmatrix} 16 & 16 & \cdots & 20 & 24 \\ 16 & 16 & & 24 & 25 \\ \vdots & & \ddots & & \vdots \\ 20 & 24 & & 54 & 71 \\ 24 & 25 & \cdots & 71 & 91 \end{bmatrix}$$

(8 × 8 ELEMENT MATRIX)

FIG. 5

A PLURALITY OF DEFINED QUANTIZATION MATRIX SETS

| | SELECTION INDEX | FEATURES OF QUANTIZATION MATRIX SETS |
|---|---|---|
| DEFINED QUANTIZATION MATRIX SET A | 0 | QUANTIZATION MATRIX FOR HIGH IMAGE QUALITY (HIGH-FREQUENCY COMPONENTS ARE QUANTIZED FINELY) |
| DEFINED QUANTIZATION MATRIX SET B | 1 | QUANTIZATION MATRIX FOR MEDIUM DEGREE (HIGH-FREQUENCY COMPONENTS ARE QUANTIZED AT MEDIUM DEGREE) |
| DEFINED QUANTIZATION MATRIX SET C | 2 | QUANTIZATION MATRIX FOR LOW RATES (HIGH-FREQUENCY COMPONENTS ARE QUANTIZED ROUGHLY) |

FIG. 22

| |
|---|
| VIDEO STREAM (PID = 0x1011, PRIMARY VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00, SECONDARY VIDEO) |
| VIDEO STREAM (PID = 0x1B01, SECONDARY VIDEO) |

FIG. 24
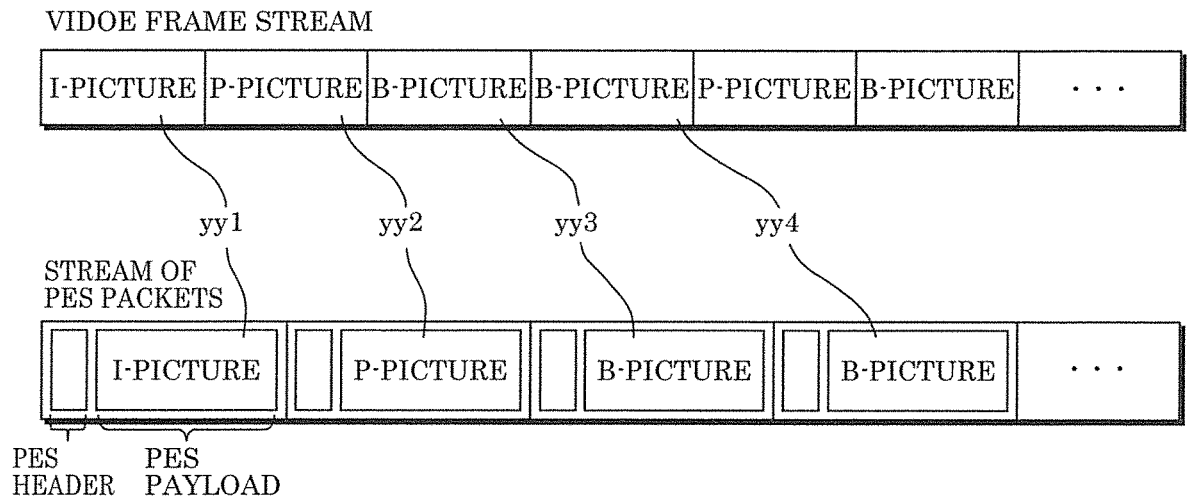
FIG. 25
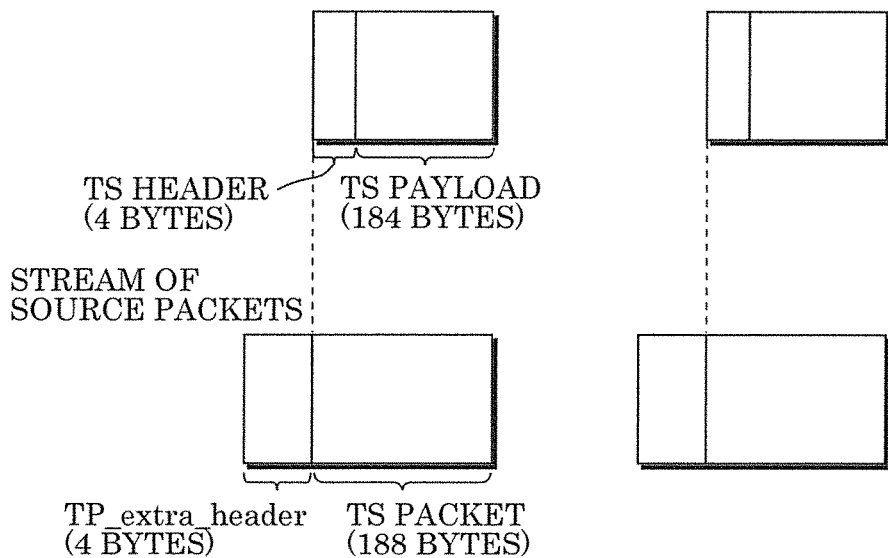
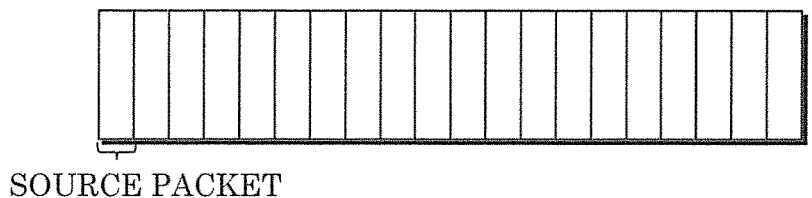

FIG. 33
| CORRESPONDING STANDARD | DRIVING FREQUENCY |
|---|---|
| MPEG-4 AVC | 500 MHz |
| MPEG-2 | 350 MHz |
| ⋮ | ⋮ |
FIG. 34A
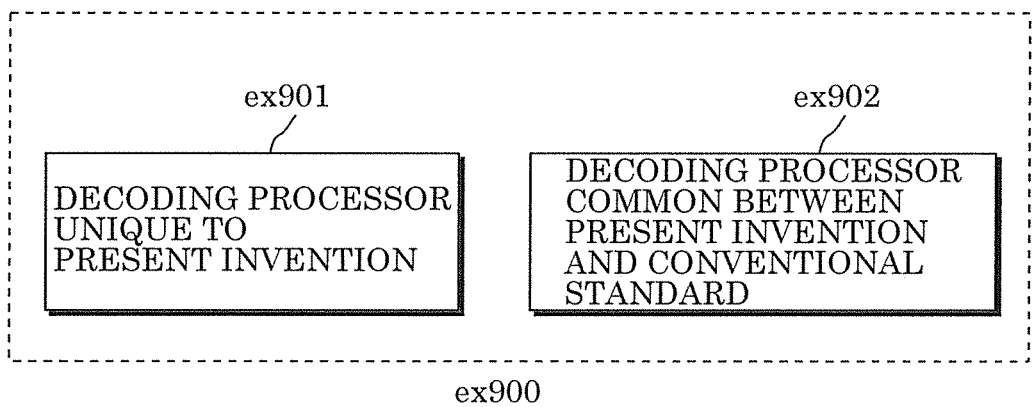
FIG. 34B
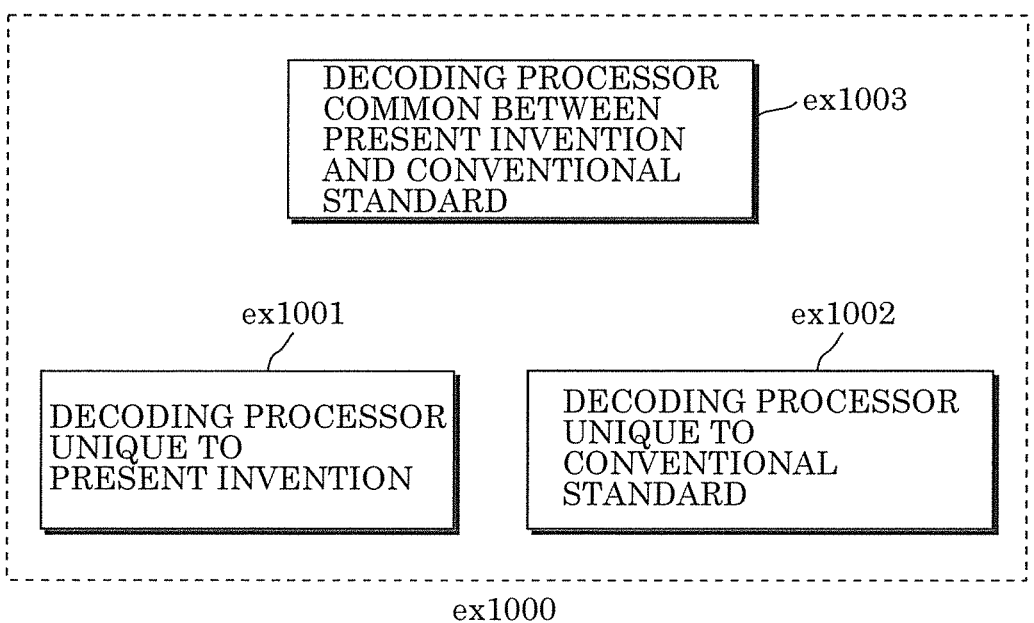

ENCODING METHOD, DECODING METHOD, ENCODING APPARATUS, AND DECODING APPARATUS

TECHNICAL FIELD

The present invention relates to an encoding method for encoding an image, or a decoding method for decoding an image, and in particular to an encoding method and a decoding method etc. both using quantization matrices.

BACKGROUND ART

There is the H.265/HEVC (high efficiency video coding) standard as the latest video coding standard (see Non-patent Literature (NPL) 1). In video coding methods including H.265/HEVC, quantization may be performed using quantization matrices having different quantization widths in accordance with frequency components. By using quantization matrices which make it possible to roughly quantize high-frequency components and finely quantize low-frequency components in coding, subjective image quality is increased because deterioration of the high-frequency components is less noticeable to human eyes. Furthermore, it is possible to use different quantization matrices in accordance with quantization modes which are determined based on prediction modes, block sizes, and pixel components. When quantization matrices are used in H.265/HEVC, quantization modes are determined in accordance with combinations of block sizes such as 4×4 and 8×8 to be used in frequency transform, prediction modes at the time when prediction images are generated, and pixel components such as luminance and chrominance. Subsequently, quantization matrices corresponding to the quantization modes are obtained and used. As such quantization matrices, a quantization matrix at a coding side which has been specified by a user or a system and a default quantization matrix may be used. When a quantization matrix is specified by a user, the user can set a quantization matrix suitable for a coding target image.

CITATION LIST

Non Patent Literature

[NPL 1] ITU-T H.265 04/2013

SUMMARY OF INVENTION

However, the coding method and the decoding method of NPL 1 have a problem of being insufficient to reduce the amount of codes.

In view of this, the present invention provides an encoding method and a decoding method which allow reduction in the amount of codes.

An encoding method according to an aspect of the present disclosure is an encoding method for encoding an image on a per block basis, the encoding method including: setting a quantization matrix set to be used to perform quantization on a target block, the quantization matrix set including a plurality of quantization matrices; performing the quantization on the target block using a quantization matrix selected based on a feature of the target block from the quantization matrix set which has been set; and encoding, in a mutually associated manner, the target block which has been subjected to the quantization and identification information for identifying the quantization matrix set which has been set, wherein, in the setting: a quantization matrix set selected from a plurality of quantization matrix sets is set as the quantization matrix set to be used to perform the quantization on the target block, the plurality of quantization matrix sets including a first quantization matrix set which is arbitrarily specified and a plurality of second quantization matrix sets which have been respectively defined in advance; and each of the plurality of second quantization matrix sets includes a quantization matrix having quantization values different from quantization values of a quantization matrix included in any other one of the plurality of second quantization matrix sets, and in the encoding, when the quantization matrix set which has been set is the first quantization matrix set, the first quantization matrix set is further encoded.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The encoding method and the decoding method according to the present invention allow reduction in the amount of codes.

BRIEF DESCRIPTION OF DRAWINGS

FIG. 4 is a diagram illustrating examples of quantization matrix sets according to Embodiment 1.

FIG. 5 is a diagram illustrating examples of a plurality of defined quantization matrix sets respectively having different features according to Embodiment 1.

FIG. 22 illustrates a structure of multiplexed data.

FIG. 24 shows how a video stream is stored in a stream of PES packets in more detail.

FIG. 25 shows a structure of TS packets and source packets in the multiplexed data.

FIG. 33 shows an example of a look-up table in which video data standards are associated with driving frequencies.

FIG. 34A is a diagram showing an example of a configuration for sharing a module of a signal processor.

FIG. 34B is a diagram showing another example of a configuration for sharing a module of the signal processor.

Figure 1:
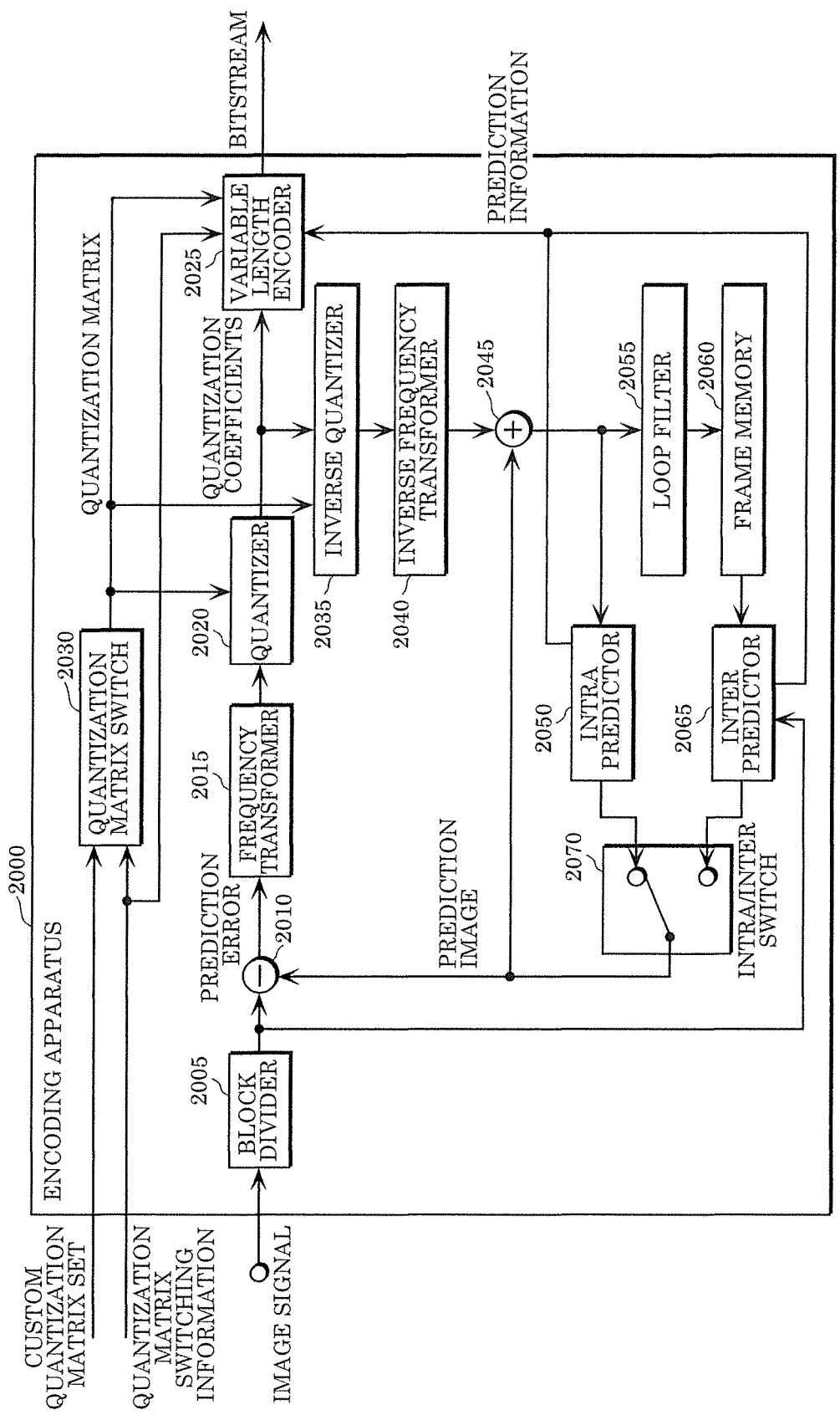
FIG. 1 is a block diagram illustrating an example of a configuration of an encoding apparatus according to Embodiment 1.

DESCRIPTION OF EXEMPLARY
EMBODIMENTS (Underlying Knowledge Forming Basis of the Present Disclosure)

The inventors found that NPL 1 described in the "Background Art" section causes the problem indicated below.

In the case of the coding method in NPL 1, usable default quantization matrices are limited, and thus quantization matrices which are specified by a user or the like need to be used frequently in order to enhance image quality. In addition, when such a quantization matrix specified by the user or the like is used, the quantization matrix needs to be included in a bitstream. Accordingly, the amount of codes increases by the amount of the quantization matrix. In other words, the occupation rate of quantization matrices in the bitstream increases with decrease in coding rate, which not only affects image quality significantly but also makes image compression difficult.

In order to solve such a problem, the encoding method according to an aspect of the present disclosure is configured as an encoding method for encoding an image on a per block basis, the encoding method including: setting a quantization matrix set to be used to perform quantization on a target block, the quantization matrix set including a plurality of quantization matrices; performing the quantization on the target block using a quantization matrix selected based on a feature of the target block from the quantization matrix set which has been set; and encoding, in a mutually associated manner, the target block which has been subjected to the quantization and identification information for identifying the quantization matrix set which has been set, wherein, in the setting: a quantization matrix set selected from a plurality of quantization matrix sets is set as the quantization matrix set to be used to perform the quantization on the target block, the plurality of quantization matrix sets including a first quantization matrix set which is arbitrarily specified and a plurality of second quantization matrix sets which have been respectively defined in advance; and each of the plurality of second quantization matrix sets includes a quantization matrix having quantization values different from quantization values of a quantization matrix included in any other one of the plurality of second quantization matrix sets, and in the encoding, when the quantization matrix set which has been set is the first quantization matrix set, the first quantization matrix set is further encoded. For example, the first quantization matrix set is a custom quantization matrix specified by the user. In addition, the second quantization matrix set is a default quantization matrix set, that is, a defined quantization matrix set.

In this way, the quantization matrix set selected from the first quantization matrix set and the plurality of second quantization matrix sets is set as the quantization matrix set to be used in quantization. With the presence of the plurality of second quantization matrix sets, it is possible to reduce the frequency at which the first quantization matrix set is selected. In addition, while the first quantization matrix set is encoded when the first quantization matrix set is set, the second quantization matrix set is defined in advance and thus is not encoded when the second quantization matrix set is selected. Accordingly, it is possible to increase the frequency at which the second quantization matrix set is set, which reduces the amount of codes. Furthermore, since each of the plurality of second quantization matrix sets includes a quantization matrix having quantization values different from quantization values of a quantization matrix included in any other one of the plurality of second quantization matrix sets, it is possible to prevent decrease in image quality also when any one of the second quantization matrix sets is set.

In this way, by selectively controlling the plurality of defined quantization matrix sets having different features, it is possible to use quantization matrices in accordance with video features and compression rates only requiring a small amount of information.

In addition, in the performing of quantization, a quantization matrix suitable for a size of the target block may be selected from the quantization matrix set which has been set, and the quantization may be performed using the quantization matrix which has been selected.

In this way, it is possible to quantize the target block appropriately using the quantization matrix in accordance with the size of the target block.

In addition, when the plurality of second quantization matrix sets include a first set and a second set respectively as second quantization matrix sets, quantization values each corresponding to a same high frequency may vary between a quantization matrix included in the first set and suitable for the size of the target block and a quantization matrix included in the second set and suitable for the size of the target block.

In this way, the plurality of second quantization matrix sets include the first set having large quantization values in the high-frequency components, and the second set having small quantization values in the high-frequency components. Accordingly, it is possible to switch the second quantization matrix set for high-quality images and the second quantization matrix set for low rates (bit rates). In other words, it is possible to use the second quantization matrix set in accordance with a desired image quality or bit rate, and thus to prevent deterioration in image quality.

In addition, in the setting: whether the first quantization matrix set is used or not may be determined; and either the first quantization matrix set or any one of the plurality of second quantization matrix sets may be selected based on a result of the determination, as the quantization matrix set to be used to perform the quantization on the target block, and in the encoding, switching information indicating the result of the determination may be encoded as at least part of the identification information.

In this way, it is possible to switch between the first quantization matrix set and the second quantization matrix set appropriately.

In addition, in the setting, a quantization matrix set may be selected from the plurality of quantization matrix sets according to priority ranks assigned respectively to the plurality of second quantization matrix sets.

In this way, when the first quantization matrix set is not selected, any one of the plurality of second quantization matrix sets is selected according to the priority ranks of the plurality of second quantization matrix sets. Subsequently, the selected second quantization matrix set is set as a quantization matrix set to be used in quantization. Accordingly, when the priority ranks are uniquely defined between the encoding apparatus which encodes an image using the encoding method and the decoding apparatus, the encoding apparatus does not need to transmit information (a selection index) indicating the second quantization matrix set that should be selected to the decoding apparatus. Thus, it is possible to further reduce the amount of codes. In addition, according to the priority ranks, it is also good to assign indices (selection indices) respectively to the plurality of second quantization matrix sets. In this case, for example, a second quantization matrix set which is frequently set has a higher priority rank, and thus is assigned with a small-value index. As a result, even when each of the indices is transmitted to the decoding apparatus, it is possible to reduce the amount of codes of these indices.

In addition, the encoding method may further include changing the priority ranks assigned respectively to the plurality of second quantization matrix sets.

In this way, for example, it is possible to change the priority ranks in accordance with coding target images and communication states, and thus to reduce the amount of codes appropriately even when the images or the communication states are changed.

In addition, a decoding method according to an aspect of the present disclosure is a decoding method for decoding an encoded image in a bitstream on a per block basis, the decoding method including: decoding a target block in the bitstream and identification information, the identification information having been encoded in association with the target block and being for identifying a quantization matrix set to be used to perform inverse quantization on the target block, the quantization matrix set including a plurality of quantization matrices; setting a quantization matrix set identified by the identification information; and performing the inverse quantization on the target block which has been decoded, using a quantization matrix selected based on a feature of the target block from the quantization matrix set which has been set, wherein in the setting: a quantization matrix set selected based on the identification information from a plurality of quantization matrix sets is set as the quantization matrix set to be used to perform the inverse quantization on the target block, the plurality of quantization matrix sets including a first quantization matrix set included in the bitstream and a plurality of second quantization matrix sets which have been respectively defined in advance; and each of the plurality of second quantization matrix sets includes a quantization matrix having quantization values different from quantization values of a quantization matrix included in any other one of the plurality of second quantization matrix sets, and in the decoding, when the quantization matrix set identified by the identification information is the first quantization matrix set, the first quantization matrix set included in the bitstream is further decoded.

In this way, the quantization matrix set selected from the first quantization matrix set and the plurality of second quantization matrix sets is set as the quantization matrix set to be used in inverse quantization. With the presence of the plurality of second quantization matrix sets, it is possible to reduce the frequency at which the first quantization matrix set is selected. In addition, while the first quantization matrix set is decoded when the first quantization matrix set is selected, since the selected second quantization matrix set is defined in advance and thus is not decoded when the second quantization matrix set is selected. Accordingly, it is possible to increase the frequency at which the second quantization matrix set is set, which reduces the amount of codes. Furthermore, since each of the plurality of second quantization matrix sets includes a quantization matrix having quantization values different from quantization values of a quantization matrix included in any other one of the plurality of second quantization matrix sets, it is possible to prevent decrease in image quality when any one of the second quantization matrix sets is set.

In addition, in the performing of inverse quantization, a quantization matrix suitable for a size of the target block may be selected from the quantization matrix set which has been set, and the inverse quantization may be performed using the quantization matrix which has been selected.

In this way, it is possible to perform inverse quantization on the target block appropriately using the quantization matrix in accordance with the size of the target block.

In addition, when the plurality of second quantization matrix sets include a first set and a second set respectively as second quantization matrix sets, quantization values each corresponding to a same high frequency may vary between a quantization matrix included in the first set and suitable for the size of the target block and a quantization matrix included in the second set and suitable for the size of the target block.

In this way, the plurality of second quantization matrix sets include the first set having large quantization values in the high-frequency components, and the second set having small quantization values in the high-frequency components. Accordingly, it is possible to switch the second quantization matrix set for high-quality images and the second quantization matrix set for low rates (bit rates). In other words, it is possible to use the second quantization matrix set in accordance with a desired image quality or bit rate, and thus to prevent deterioration in image quality.

In addition, in the decoding, switching information may be decoded, the switching information being included in the identification information and indicating whether the first quantization matrix set is used or not, and in the setting, either the first quantization matrix set or any one of the plurality of second quantization matrix sets may be selected based on the switching information, as the quantization matrix set to be used to perform the inverse quantization on the target block.

In this way, it is possible to switch between the first quantization matrix set and the second quantization matrix set appropriately.

In addition, in the setting, a quantization matrix set may be selected from the plurality of quantization matrix sets according to priority ranks assigned respectively to the plurality of second quantization matrix sets.

In this way, when the first quantization matrix set is not selected, any one of the plurality of second quantization matrix sets is selected according to the priority ranks of the plurality of second quantization matrix sets. Subsequently, the selected second quantization matrix set is set as a quantization matrix set to be used in inverse quantization. Accordingly, when the priority ranks are uniquely defined between the encoding apparatus and the decoding apparatus which decodes an image using the decoding method, the encoding apparatus does not need to transmit information (selection index) indicating the second quantization matrix set that should be selected to the decoding apparatus. Thus, it is possible to further reduce the amount of codes. In addition, according to the priority ranks, it is also good to assign indices (selection indices) respectively to the plurality of second quantization matrix sets. In this case, for example, a second quantization matrix set which is frequently set has a higher priority rank, and thus is assigned with a small-value index. As a result, even when each of the indices is transmitted from the encoding apparatus, it is possible to reduce the amount of codes of these indices.

In addition, the encoding method may further include changing the priority ranks assigned respectively to the plurality of second quantization matrix sets.

In this way, for example, it is possible to change the priority ranks in accordance with coding target images and communication states, and thus to reduce the amount of codes appropriately even when the images or the communication states are changed.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are described in detail with reference to the drawings.

Each of the exemplary embodiments described below shows a general or specific example. The numerical values, shapes, materials, constituent elements, the arrangement and connection of the constituent elements, steps, the processing order of the steps etc. shown in the following exemplary embodiments are mere examples, and therefore do not limit the scope of the present invention. Therefore, among the constituent elements in the following exemplary embodiments, constituent elements not recited in any one of the independent claims which define the most generic concept are described as arbitrary constituent elements.

It is to be noted that, in the embodiments described below, detailed descriptions of well-known matters or overlapping descriptions of substantially the same constituent elements may be omitted. Such explanation is omitted to prevent the following explanation from being unnecessarily redundant, thereby facilitating the understanding of a person skilled in the art.

Embodiment 1

One of the embodiments which is an encoding apparatus which performs an encoding method according to the present disclosure is described with reference to FIGS. 1 to 9.

FIG. 1 is a block diagram illustrating an example of a configuration of the encoding apparatus according to Embodiment 1. Encoding apparatus 2000 includes block divider 2005, subtracter 2010, frequency transformer 2015, quantizer 2020, variable length encoder 2025, quantization matrix switch 2030, inverse quantizer 2035, inverse frequency transformer 2040, adder 2045, intra predictor 2050, loop filter 2055, frame memory 2060, inter predictor 2065, and intra/inter switch 2070.

Encoding apparatus 2000 encodes an input image signal, specifically, encodes an image on a per block basis to generate a bitstream. At that time, block divider 2005 divides an image which is a still image or a video including one or more pictures represented by the image signal into blocks which are coding processing units. Subtracter 2010 performs subtraction between a target block which is a coding target block and a prediction block (prediction image) generated by intra predictor 2050 or inter predictor 2065, to generate a difference block (prediction error). Frequency transformer 2015 performs frequency transform on the generated difference block.

Quantizer 2020 performs quantization on a plurality of frequency coefficients obtained through the frequency transform using a quantization matrix which is output from quantization matrix switch 2030. Inverse quantizer 2035 performs inverse quantization on the plurality of quantization coefficients obtained through the quantization, using the same quantization matrix as the quantization matrix used by quantizer 2020.

Inverse frequency transformer 2040 performs inverse frequency transform on the plurality of frequency coefficients obtained through the inverse quantization. Adder 2045 adds the prediction block generated by intra predictor 2050 or inter predictor 2065 and the difference block reconstructed through the inverse transform to generate a decoded image.

Loop filter 2055 performs filtering for reducing influence of encoding on the generated decoded image, and stores the filtered decoded image in frame memory 2060. This filtering is, for example, filtering using a deblocking filter for removing distortion at block boundaries.

Intra predictor 2050 performs intra prediction using the decoded image generated by adder 2045 to generate a prediction block for the target block. Inter predictor 2065 performs inter prediction using the target block and the decoded image stored in frame memory 2060 to generate a prediction block for the target block. Each of intra predictor 2050 and inter predictor 2065 outputs information used for the prediction as prediction information to variable length encoder 2025.

Intra/inter switch 2070 switches prediction blocks to be output to subtracter 2010 and adder 2045 between the prediction block generated through the intra prediction and the prediction block generated through the inter prediction.

Quantization matrix switch 2030 obtains quantization matrix switching information for switching quantization matrix sets (hereinafter referred to as use quantization matrix sets) to be used for quantization and inverse quantization. The quantization matrix switching information is identification information indicating either a custom quantization matrix set or any one of a plurality of defined quantization matrix sets. The custom quantization matrix set is a quantization matrix set which includes a plurality of quantization matrices and is arbitrarily specified by a user or a system. The defined quantization matrix set is a quantization matrix set including a plurality of quantization matrices which have been defined in advance. It is to be noted that the custom quantization matrix set is a first quantization matrix set, and the defined quantization matrix set is a second quantization matrix set. In addition, hereinafter, each of the plurality of quantization matrices included in the custom quantization matrix set is referred to as a custom quantization matrix. The use of the custom quantization matrices makes it possible to adjust image quality arbitrarily. Likewise, each of the plurality of quantization matrices included in the defined quantization matrix set is referred to as a defined quantization matrix.

Upon obtaining the quantization matrix switching information, quantization matrix switch 2030 selects any one of the plurality of quantization matrix sets based on the quantization matrix switching information. Subsequently, quantization matrix switch 2030 sets the selected quantization matrix set as a use quantization matrix set. Hereinafter, selecting and setting a quantization matrix set is referred to as quantization matrix setting processing. Subsequently, quantization matrix switch 2030 outputs the quantization matrices included in the use quantization matrix set to quantizer 2020 and inverse quantizer 2035.

In addition, when the obtained quantization matrix switching information indicates the custom quantization matrix set, quantization matrix switch 2030 obtains the custom quantization matrix set. In this case, quantization matrix switch 2030 selects the custom quantization matrix set from the plurality of quantization matrix sets, and sets the selected custom quantization matrix set as the use quantization matrix set. Furthermore, quantization matrix switch 2030 outputs the custom quantization matrix set to variable length encoder 2025.

Variable length encoder 2025 performs variable length encoding on the plurality of quantization coefficients obtained through the quantization, the prediction information, and the quantization matrix switching information, to generate a bitstream. In addition, when variable length encoder 2025 obtains the custom quantization matrix set from quantization matrix switch 2030, variable length encoder 2025 performs variable length encoding also on the custom quantization matrix set. In this way, the bitstream including the custom quantization matrix set subjected to the variable length encoding is generated.

Figure 2:
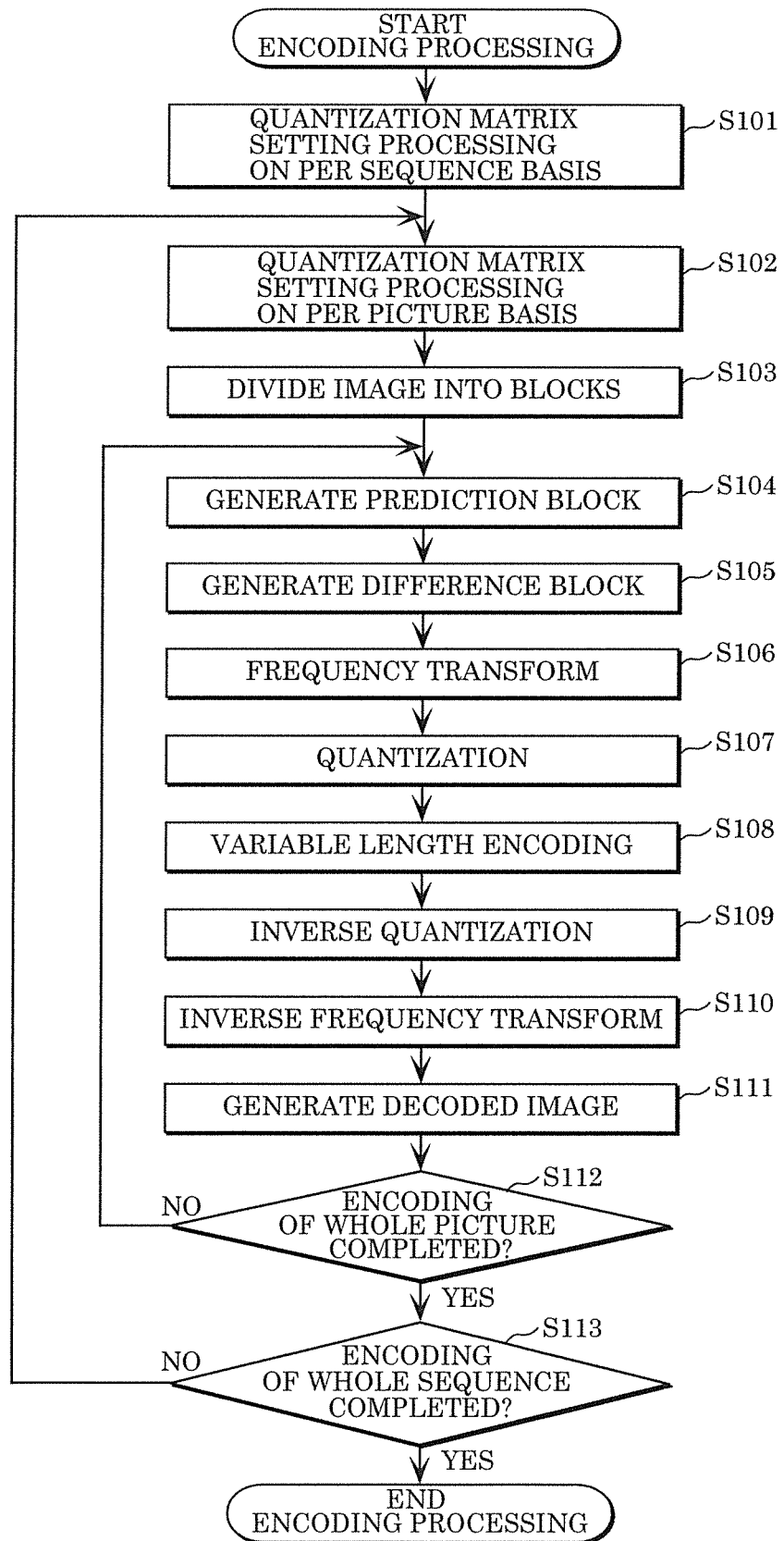
FIG. 2 is a flowchart illustrating examples of processing operations performed by the encoding apparatus according to Embodiment 1.

FIG. 2 is a flowchart illustrating examples of processing operations performed by encoding apparatus 2000 according to Embodiment 1.

First, quantization matrix switch 2030 performs quantization matrix setting processing on a per sequence basis (S101). Next, quantization matrix switch 2030 performs quantization matrix setting processing on a per picture basis (S102).

Next, block divider 2005 divides an image which is a still image or a video including one or more pictures into blocks (S103). Next, intra predictor 2050, inter predictor 2065, and intra/inter switch 2070 generate a prediction block for a target block on a per block basis using a decoded image (S104). Subsequently, subtracter 2010 generates a difference block from the target block and the prediction block (S105). Frequency transformer 2015 performs frequency transform on the generated difference block (S106). Quantizer 2020 performs quantization on the plurality of frequency coefficients obtained in Step S106 (S107).

Variable length encoder 2025 performs variable length encoding on the plurality of quantization coefficients and quantization matrix switching information obtained through the quantization in Step S107, to generate a bitstream (S108). At this time, variable length encoder 2025 encodes (performs variable length encoding on), in an associated manner, the quantized target block and the quantization matrix switching information which is identification information for identifying the quantization matrix set which has been set in Step S101 or S102. In addition, when the quantization matrix set which has been set is a custom quantization matrix set, variable length encoder 2025 further encodes (performs variable length encoding on) the custom quantization matrix set.

In addition, inverse quantizer 2035 performs inverse quantization on the plurality of quantization coefficients obtained in Step S107, using the same quantization matrix as the quantization matrix used in Step S107 (S109). Inverse frequency transformer 2040 performs inverse frequency transform on the plurality of frequency coefficients obtained in Step S109 (S110). Subsequently, adder 2045 generates a decoded image for the target block, from the prediction block generated in Step S104 and the difference block reconstructed through the inverse frequency transform in Step S110 (S111).

Encoding apparatus 2000 determines whether or not the processing from Steps S104 to S111 have been performed on the whole picture, that is, whether or not encoding of the whole picture has been completed (S112). Here, when it is determined that encoding of the whole picture has not yet been completed (No in S112), encoding apparatus 2000 repeats the processing starting with Step S104. On the other hand, when determining that the encoding of the whole picture has been completed (Yes in S112), encoding apparatus 2000 determines whether or not encoding of the whole sequence has been completed (S113). Here, when determining that encoding of the whole sequence has not yet been completed (No in S113), encoding apparatus 2000 repeats the processing starting with Step S102. On the other hand, when determining that the encoding of the whole sequence has been completed (Yes in S113), encoding apparatus 2000 ends the encoding of the image signal performed on a per sequence basis.

It is to be noted that encoding apparatus 2000 may perform the frequency transform in Step S106 and the quantization in Step S107 sequentially as separate processing, or may perform the two processes collectively. Here, quantization means digitalization of values sampled at previously defined intervals in association with previously specified levels, and inverse quantization means getting back the digital values to values in the original segments. In the data compression field, quantization is processing for dividing into segments which are rougher than original, and inverse quantization is a process for re-dividing the rougher segments into the original finer segments. In the codec technique field, expressions such as rounding and scaling may be used for quantization and inverse quantization.

Figure 3:
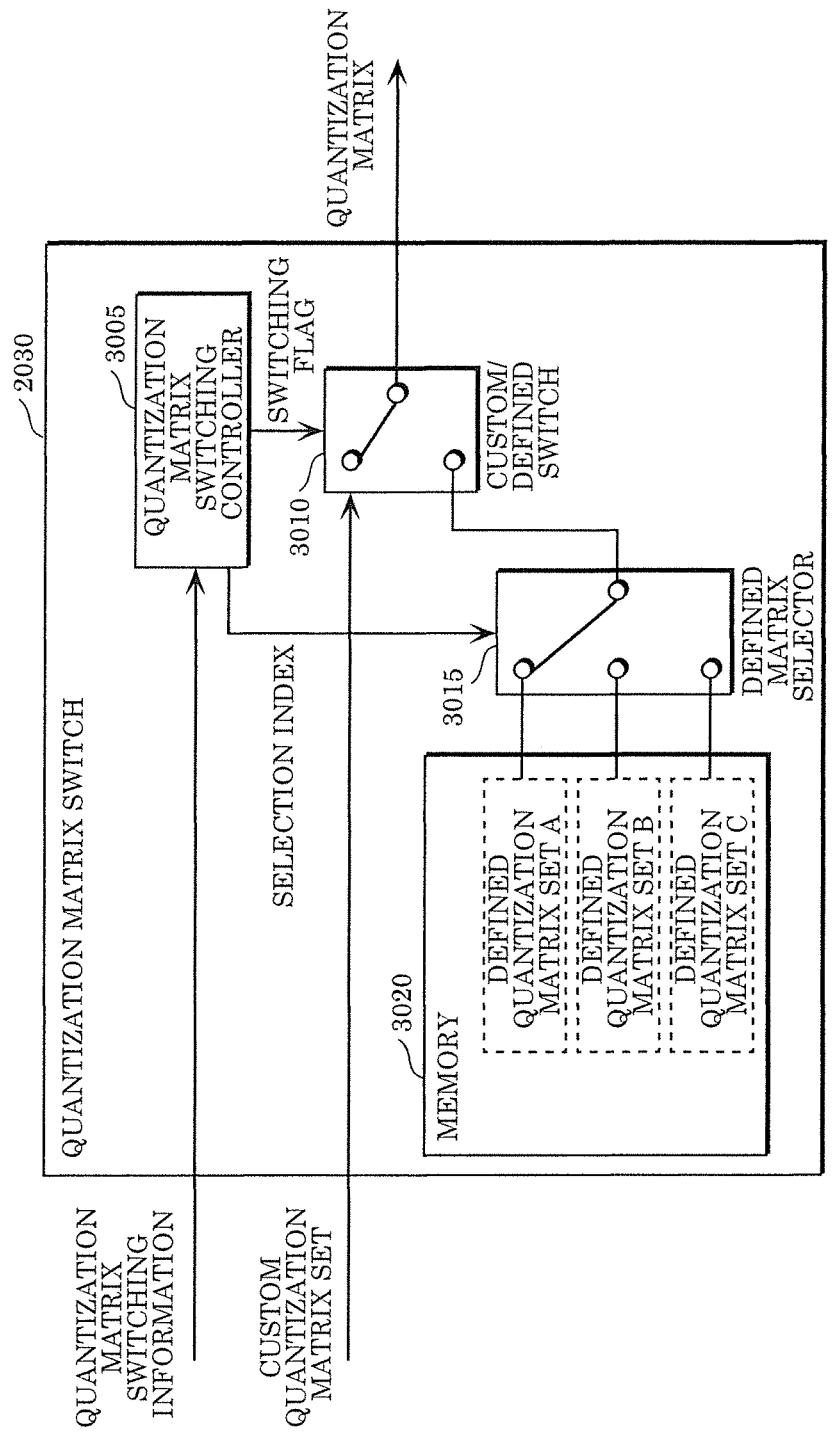
FIG. 3 is a block diagram illustrating an example of a configuration of a quantization matrix switch according to Embodiment 1.

FIG. 3 is a block diagram illustrating an example of a configuration of quantization matrix switch 2030. Quantization matrix switch 2030 includes quantization matrix switching controller 3005, custom/defined switch 3010, defined matrix selector 3015, and memory 3020. Memory 3020 stores defined quantization matrix set A, defined quantization matrix set B, and defined quantization matrix set C. Quantization matrix switch 2030 outputs a quantization matrix in accordance with an input of a custom quantization matrix set and quantization matrix switching information.

More specifically, quantization matrix switching controller 3005 obtains quantization matrix switching information, and divides a selection index and a switching flag from the quantization matrix switching information. The selection index is an index indicating one of defined quantization matrix sets A to C. The switching flag is a flag (switching information) indicating which one of the custom quantization matrix set and the defined quantization matrix set is used as a use quantization matrix set. It is to be noted that when the switching flag indicates that the custom quantization matrix is used, the quantization matrix switching information does not include any selection index.

Upon obtaining the selection index from quantization matrix switching controller 3005, defined matrix selector 3015 selects the defined quantization matrix set indicated by the selection index from defined quantization matrix sets A to C. In other words, defined matrix selector 3015 places the selected defined quantization matrix into a ready state for output.

For example, defined matrix selector 3015 selects defined quantization matrix set A when the selection index is 0, and selects defined quantization matrix set B when the selection index is 1. Alternatively, defined matrix selector 3015 selects defined quantization matrix set C when the selection index is 2. Here, when there is no such selection index even when the switching flag indicates that one of the defined quantization matrix sets is used, defined matrix selector 3015 may select one of the defined quantization matrix sets according to a predetermined rule. For example, the predetermined rule relates to priority ranks which have been assigned respectively to the plurality of defined quantization matrix sets. In other words, defined matrix selector 3015 selects one of the plurality of defined quantization matrix sets in accordance with the priority ranks which have been assigned respectively to the plurality of defined quantization matrix sets. For example, defined matrix selector 3015 may select defined quantization matrix A having the highest priority rank. In this way, even if no selection index is included in a bitstream, it is possible to select the defined quantization matrix, which makes it further reduce the amount of codes of the bitstream.

Custom/defined switch 3010 obtains a switching flag from quantization matrix switching controller 3005. In accordance with the switching flag, custom/defined switch 3010 switches one of the custom quantization matrix set and the selected defined quantization matrix set to a ready state for output as a use quantization matrix set. In this way, the use quantization matrix set is set. In other words, when the switching flag indicates that the custom quantization matrix set is used, custom/defined switch 3010 obtains the custom quantization matrix set, and places the custom quantization matrix set into the ready state for output. Furthermore, custom/defined switch 3010 selects a custom quantization matrix in accordance with a quantization mode from the custom quantization matrix set, and outputs the custom quantization matrix. On the other hand, when the switching flag indicates that a defined quantization matrix is used, custom/defined switch 3010 places the selected defined quantization matrix set into the ready state for output as a use quantization matrix set. Furthermore, custom/defined switch 3010 selects the defined quantization matrix in accordance with a quantization mode from the selected defined quantization matrix set, and outputs the defined quantization matrix. It is to be noted that the quantization mode is a mode which is determined based on a combination of the size of a coding target block or slice, a prediction mode, and luminance or chrominance, or the like.

It is to be noted that defined quantization matrix set A, defined quantization matrix set B, and defined quantization matrix set C may be stored in the same memory or may be stored in separate memories.

FIG. 4 is a diagram illustrating examples of quantization matrix sets. As illustrated in FIG. 4, each of quantization matrix sets such as the defined quantization matrix sets and the custom quantization matrix set includes a plurality of quantization matrices. For example, one of the quantization matrix sets includes a first quantization matrix suitable for a block of a 4×4 size, a second quantization matrix suitable for a block of an 8×8 size or larger for which intra prediction is performed, and a third quantization matrix suitable for a block of an 8×8 size or larger for which inter prediction is performed.

When quantizer 2020 performs quantization on a target block having a size larger than the 8×8 size, quantizer 2020 enlarges the second or third quantization matrix having the 8×8 size to the size of the target block by liner interpolation, and uses the enlarged one. In this way, quantizer 2020 selects the quantization matrix suitable for the size of the target block from the quantization matrix set which has been set by quantization matrix switch 2030, and performs quantization using the selected quantization matrix.

It is to be noted that a quantization matrix set may include a quantization matrix having a 16×16 size and a quantization matrix having a 32×32 size. In this case, it is possible to define quantization matrices more finely, which reduces quantization errors and enhances subjective image quality. In addition, processing for enlarging a quantization matrix other than linear interpolation may be performed. In this way, the quantization matrix set may include all of quantization matrices respectively suitable for quantization modes (such as the sizes of target blocks), or may include information which allows generation of the quantization matrices respectively suitable for quantization modes. The information may be a base quantization matrix such as the second or third quantization matrix illustrated in FIG. 4. In addition, the information may be information indicating features of a quantization matrix set and design details of the respective quantization matrices.

The one or more quantization matrices included in the quantization matrix set has the same feature. The feature is, for example, a quantization level (quantization width) of the high-frequency components included in a plurality of frequency coefficients or quantization coefficients. By performing fine quantization or inverse quantization, that is, by reducing the quantization width, it is possible to reduce deterioration of high-frequency components due to the quantization and inverse quantization.

Defined quantization matrix sets A to C have mutually different features.

FIG. 5 is a diagram illustrating examples of the plurality of defined quantization matrix sets respectively having different features.

As illustrated in FIG. 5, defined quantization matrix sets A to C are defined based on the compression rates of high-frequency components. Defined quantization matrix set C is a set for low rates (bit rates), and defined quantization matrix set A is a set for high image quality. Defined quantization matrix set B is a set having an intermediate feature which is between features of defined quantization matrix set A and defined quantization matrix set C. The set for low rates is a quantization matrix set including a quantization matrix defined for rougher quantization of high-frequency components compared with the quantization matrix for high-image quality. With this quantization matrix set, a bitstream having a low bit rate is obtained. On the other hand, each of the quantization matrices included in defined quantization matrix set A is defined for finest quantization of high-frequency components. Each of the quantization matrices included in defined quantization matrix set B is defined for rougher quantization of high-frequency components than defined quantization matrix set A. Each of the quantization matrices included in defined quantization matrix set C is defined for roughest quantization of high-frequency components. In other words, the quantization widths (quantization values) of high-frequency components in the quantization matrices included in the defined quantization matrix sets are larger in the listed order of defined quantization matrix set A, defined quantization matrix set B, and defined quantization matrix set C. In this case, it is possible to select a quantization matrix in accordance with a desired compression rate, and to expect enhancement of subjective image quality.

In this way, in this embodiment, when the plurality of defined quantization matrix sets include the first set (defined quantization matrix set A) and the second set (defined quantization matrix set B), the quantization values each corresponding to the same high frequency vary between the quantization matrix included in the first set and suitable for the size of the target block and the quantization matrix included in the second set and suitable for the size of the target block. In addition, each of the plurality of defined quantization matrix sets includes a quantization matrix having quantization values different from quantization values of a quantization matrix included in any other one of the plurality of second quantization matrix sets. In other words, each of the plurality of defined quantization matrix sets is not composed only of a flat quantization matrix in which all of the quantization values are same.

Although memory 3020 according to this embodiment stores the plurality of defined quantization matrix sets suitable for compression rates or image quality, it is also possible to store, for example, a plurality of defined quantization matrix sets suitable for the kinds of images. For example, memory 3020 may store a defined quantization matrix set for images (natural images) captured by a camera and a defined quantization matrix set for images (artificial images) created artificially using computer graphics (CG) or animation. Artificial images have steeper edge information than natural images, and thus deterioration in high-frequency components is likely to affect image quality. For this reason, it is possible to reduce visual deterioration of the artificial images in quantization by defining the quantization matrix for artificial images as a quantization matrix for performing finer quantization on high-frequency components than the quantization matrix for natural images. In this case, it is possible to select a quantization matrix suitable for each of a CG image and a natural image which are co-present in a sequence or a picture, and thus to expect enhancement of image quality. It is to be noted that the methods for defining these quantization matrix sets do not need to be independent, and that (i) the quantization matrix set for low rates and the quantization matrix set for high image quality and (ii) the quantization matrix set for natural images and the quantization matrix set for artificial images may be combined. For example, it is also good to define four kinds of quantization matrix sets which are respectively for natural images each having a low rate, artificial images each having a low rate, natural images each having a high image quality, artificial images each having high image quality, and store these quantization matrix sets in memory 3020 as defined quantization matrix sets.

It is to be noted that a default matrix which is defined in HEVC may be included as, for example, defined quantization matrix set A included in the plurality of defined quantization matrix sets.

Figure 6:
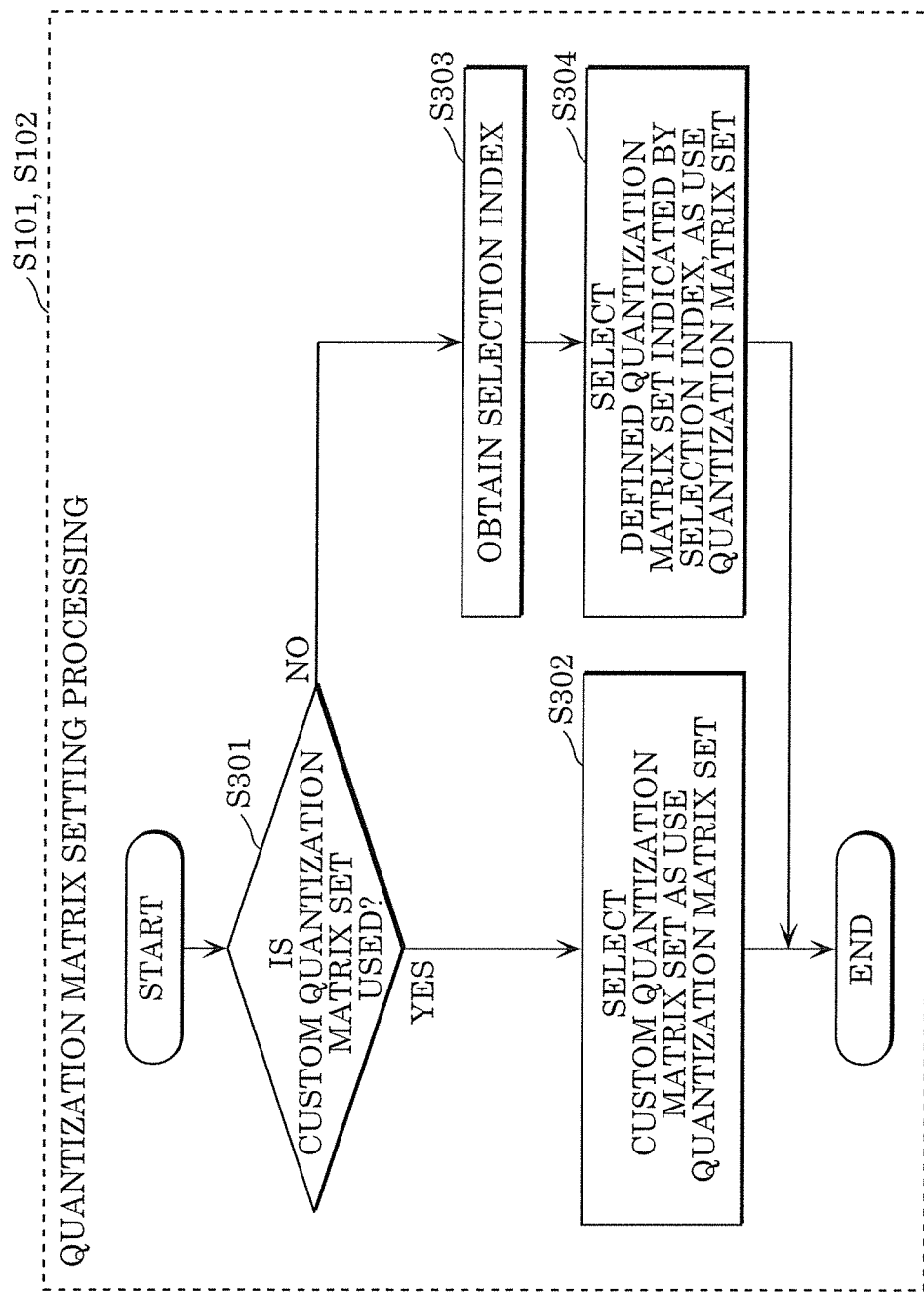
FIG. 6 is a flowchart illustrating an example of quantization matrix setting processing according to Embodiment 1.

FIG. 6 is a flowchart illustrating quantization matrix setting processing in Steps S101 and S102 illustrated in FIG. 2. It is to be noted that the quantization matrix setting processing in Step S101 and the quantization matrix setting processing in Step S102 are the same except for whether the processing is performed on a per sequence basis or on a per picture basis.

First, custom/defined switch 3010 determines whether or not a custom quantization matrix set is used, based on a switching flag divided from quantization matrix switching information (S301). When determining that the custom quantization matrix set is used (Yes in S301), custom/defined switch 3010 selects the custom quantization matrix set as a use quantization matrix set (S302). In other words, custom/defined switch 3010 places the custom quantization matrix set into a ready state for output.

On the other hand, when determining that no custom quantization matrix is used (No in S301), custom/defined switch 3010 selects a defined quantization matrix set as a use quantization matrix set. At this time, first, defined matrix selector 3015 obtains a selection index which specifies one of the plurality of defined quantization matrix sets A to C (S303). Defined matrix selector 3015 selects the defined quantization matrix set corresponding to the obtained selection index from among the plurality of defined quantization matrix sets A to C. In other words, defined matrix selector 3015 places the defined quantization matrix set into a ready state for output. Subsequently, custom/defined switch 3010 selects the defined quantization matrix set selected by defined matrix selector 3015 as a use quantization matrix set (S304). In other words, custom/defined switch 3010 places the selected defined quantization matrix set into a ready state for output.

In this way, in this embodiment, quantization matrix switch 2030 determines whether or not the custom quantization matrix set is used. Based on the determination result, quantization matrix switch 2030 then selects either the custom quantization matrix set or any one of defined quantization matrix sets A to C as a quantization matrix set to be used to quantize a target block. In addition, variable length encoder 2025 encodes (performs variable length encoding on) switching information (a switching flag) indicating the determination result as at least part of identification information (quantization matrix switching information).

It is to be noted that, in the HEVC standard, whether to use a predefined default matrix or a custom quantization matrix is switched.

It is to be noted that one of the defined quantization matrix sets may be selected without using any selection index in Steps S303 and S304. For example, encoding apparatus 2000 may test quantization using each of one or more of the defined quantization matrix sets, and select the defined quantization matrix set which is specified by a user. Alternatively, encoding apparatus 2000 may analyze a feature or a state of an image which is a target for quantization and inverse quantization, and select one defined quantization matrix set in accordance with the analysis result from the one or more defined quantization matrix sets.

Figure 7:
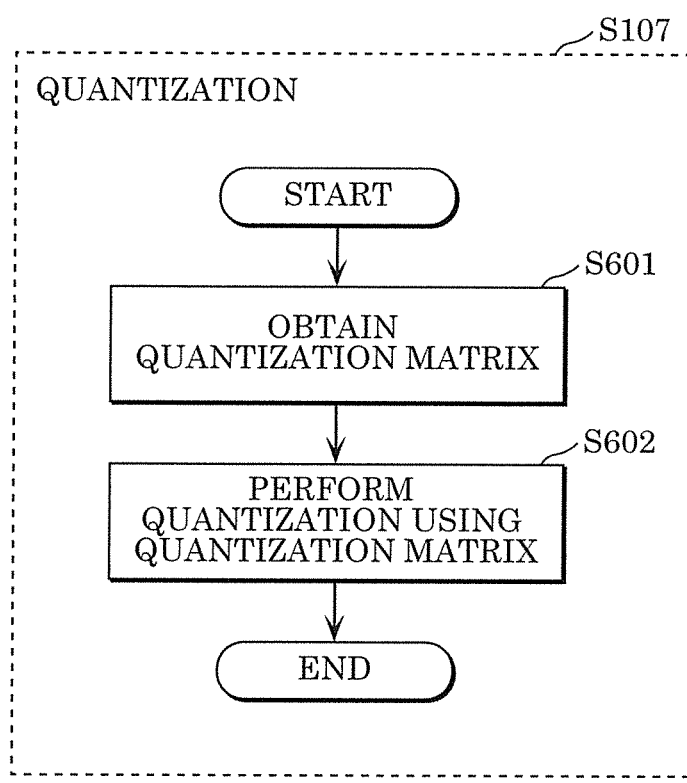
FIG. 7 is a flowchart illustrating an example of quantization according to Embodiment 1.

FIG. 7 is a flowchart illustrating an example of quantization in Step S107 illustrated in FIG. 2.

First, quantizer 2020 obtains a quantization matrix in accordance with a quantization mode from a use quantization matrix set which has been set by quantization matrix switch 2030 (S601). Quantizer 2020 performs quantization on frequency coefficients using the obtained quantization matrix (S602). In the obtainment of the quantization matrix in Step S601, quantizer 2020 obtains the quantization matrix included in the quantization matrix set which has been set in Steps S101 and S102. At this time, quantizer 2020 obtains the quantization matrix in accordance with a feature (quantization mode) of the target block, such as the size of the target block or prediction information at the time of generation of a prediction image.

It is to be noted that quantizer 2020 may determine whether or not to use any quantization matrix before performing the processing in Steps S610 and S602, and switch processing depending on the determination result. For example, when determining not to use any quantization matrix, quantizer 2020 performs quantization on all frequency components using the same value. Only when determining to use a quantization matrix, quantizer 2020 performs the processing in Steps S601 and S602.

In addition, inverse quantizer 2035 performs, in Step S109, approximately the same processing as in Step 107. At this time, inverse quantizer 2035 performs inverse quantization instead of quantization in Step S602 included in Step S107, and thereby performs the processing in Step S109.

Figure 8:
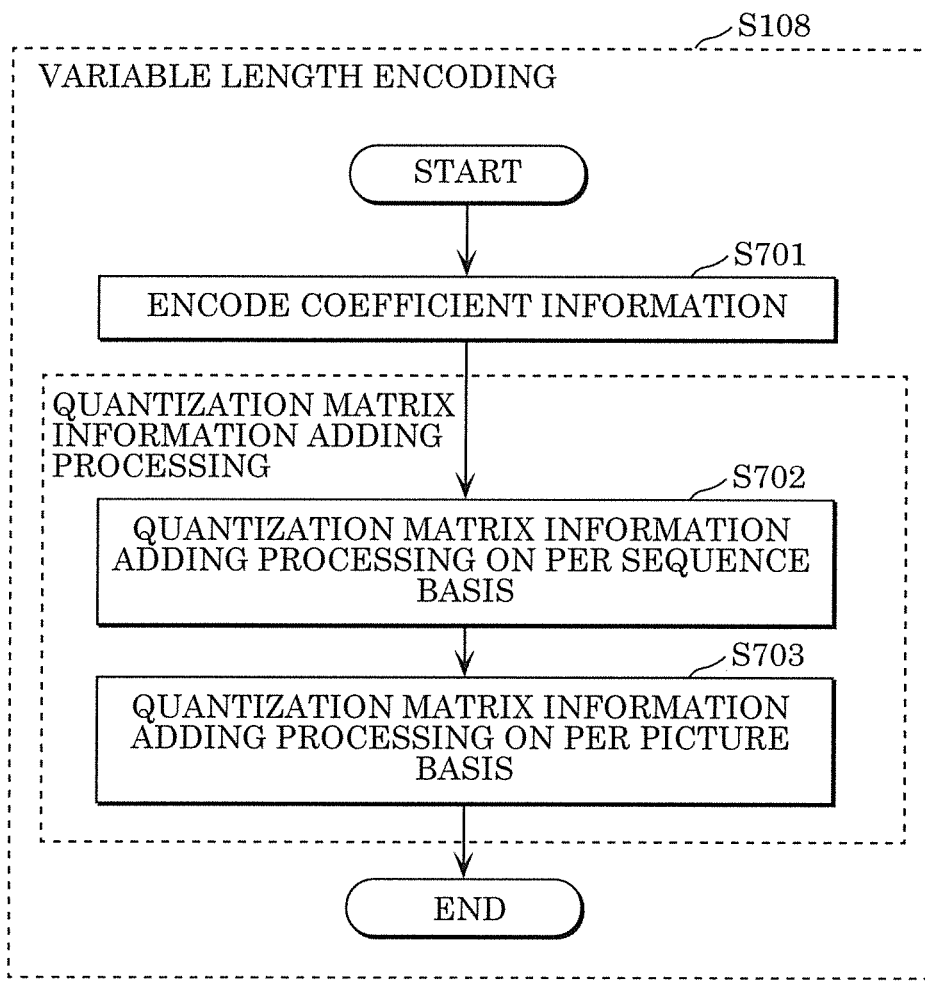
FIG. 8 is a flowchart illustrating an example of variable length encoding according to Embodiment 1.

FIG. 8 is a flowchart illustrating an example of variable length encoding in Step S108 illustrated in FIG. 2.

First, variable length encoder 2025 encodes (performs variable length encoding on) coefficient information (a plurality of quantization coefficients) which are obtained through the quantization in Step S107 illustrated in FIG. 2 (S701). Next, variable length encoder 2025 performs quantization matrix information adding processing on a per sequence basis (S702). This quantization matrix information adding processing is processing for adding information (quantization matrix information) related to a quantization matrix to a bitstream. The information is, for example, whether or not to use a quantization matrix for performing quantization on a per sequence basis, and a specific design of the quantization matrix when the quantization matrix is used. For example, variable length encoder 2025 performs variable length encoding on the quantization matrix information on a per sequence bases, and adds the encoded one to a sequence parameter set (SPS) of a bitstream. Lastly, variable length encoder 2025 performs quantization matrix information adding processing on a per picture basis (S703). For example, variable length encoder 2025 performs variable length encoding on the quantization matrix information on a per picture bases, and adds the encoded quantization matrix information to a picture parameter set (PPS) of the bitstream. It is to be noted that the applicable ranges of the quantization matrix information added in Steps S702 and S703 vary between the picture and the sequence.

Figure 9:
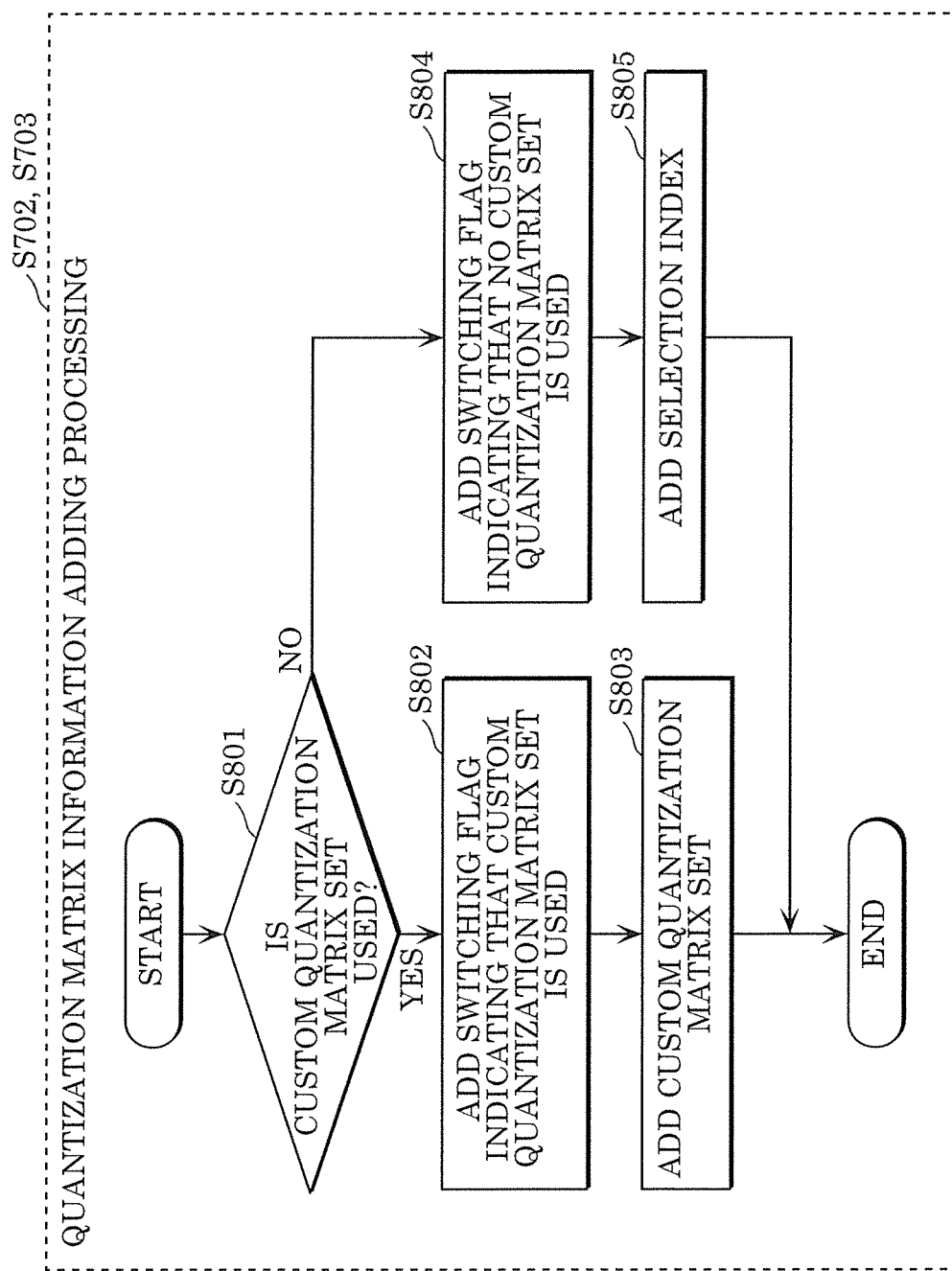
FIG. 9 is a flowchart illustrating an example of quantization matrix information adding processing according to Embodiment 1.

FIG. 9 is a flowchart illustrating quantization matrix information adding processing in Steps S702 and S703 illustrated in FIG. 8.

First, variable length encoder 2025 determines whether or not a custom quantization matrix is used, based on quantization matrix switching information (S801). Here, when determining that the custom quantization matrix is used (Yes in S801), variable length encoder 2025 adds, to a bitstream, a switching flag indicating that the custom quantization matrix set is used (S802). Subsequently, variable length encoder 2025 adds the custom quantization matrix set to the bitstream (S803). In this way, the quantization matrix information including (i) the quantization matrix switching information composed only of the switching flag and (ii) the custom quantization matrix set is subjected to variable length encoding and then added to the bitstream.

On the other hand, when determining that no custom quantization matrix is used (No in S801), variable length encoder 2025 adds, to the bitstream, a switching flag indicating that no custom quantization matrix set is used (S804). Subsequently, variable length encoder 2025 adds a selection index to the bitstream (S805). In this way, as quantization matrix information, the quantization matrix switching information including the switching flag and the selection index are subjected to variable length encoding and then added to the bitstream.

It is to be noted that variable length encoder 2025 may perform variable length encoding on quantization matrix information and add the encoded quantization matrix information to the bitstream, or add the quantization matrix information to the bitstream as it is. When performing variable length encoding on the quantization matrix information, the amount of information can be reduced.

(Effects)

As described above, the encoding method according to this embodiment includes a setting step, a quantization step, and an encoding step. In the setting step, a quantization matrix set to be used to perform quantization on a target block is set. The quantization matrix set includes a plurality of quantization matrices. In the quantization step, the quantization on the target block is performed using a quantization matrix selected based on a feature of the target block from the quantization matrix set which has been set. In the encoding, the target block which has been subjected to the quantization and identification information for identifying the quantization matrix set which has been set are encoded in a mutually associated manner. In addition, in the setting step, a quantization matrix set selected from a plurality of quantization matrix sets is set as the quantization matrix set (use quantization matrix set) to be used to perform the quantization on the target block. The plurality of quantization matrix sets includes a custom quantization matrix set which is arbitrarily specified and a plurality of defined quantization matrix sets which have been respectively defined in advance. In addition, each of the plurality of defined quantization matrix sets includes a quantization matrix having quantization values different from quantization values of a quantization matrix included in any other one of the plurality of second quantization matrix sets. In addition, in the encoding, when the quantization matrix set which has been set is the custom quantization matrix set, the custom quantization matrix set is further encoded.

In this way, the custom quantization matrix set and the quantization matrix set selected from the plurality of defined quantization matrix sets are set as quantization matrix sets to be used in quantization. Accordingly, with the presence of the plurality of defined quantization matrix sets, it is possible to reduce the frequency at which the custom quantization matrix set is selected. Furthermore, while the custom quantization matrix set is encoded when the custom quantization matrix set is set, the defined quantization matrix set is defined in advance and thus is not encoded when the defined quantization matrix set is selected. Accordingly, it is possible to increase the frequency at which the defined quantization matrix set is set, which reduces the amount of codes. Furthermore, since each of the plurality of defined quantization matrix sets includes a quantization matrix having quantization values different from quantization values of a quantization matrix included in any other one of the plurality of second quantization matrix sets, it is possible to prevent decrease in image quality when any one of the defined quantization matrix sets is set.

In other words, by selecting and using any one of the plurality of defined quantization matrix sets, it is possible to use the quantization matrix suitable for an image feature and a compression rate only requiring a small amount of information. As a result, it is possible to increase subjective image quality without increasing the amount of information.

It is to be noted that, in the present disclosure, the plurality of defined quantization matrix sets are the three quantization matrix sets which are defined quantization matrix set A, defined quantization matrix set B, and defined quantization matrix set C, but the number of quantization matrix sets may be two or more.

In addition, it is possible to change the number of defined quantization matrix sets in accordance with a coding target image or a communication state, or change the priority ranks of the plurality of defined quantization matrix sets. In other words, quantization matrix switch 2030 changes the priority ranks assigned respectively to the plurality of defined quantization matrix sets.

For example, quantization matrix switch 2030 changes the priority rank of a defined quantization matrix set suitable for a compression rate or an image kind which is likely to be requested to a higher priority rank. The defined quantization matrix set is, for example, a defined quantization matrix set for low bit rates or a defined quantization matrix set for natural images. Subsequently, quantization matrix switch 2030 sets, in advance, a small value of 0 or 1 as the selection index of the defined quantization matrix having the high priority rank. In other words, a defined quantization matrix set having a higher priority rank is assigned with a smaller-value selection index.

Furthermore, quantization matrix switch 2030 may change a possible value for the selection index, in accordance with an image or a communication state. For example, in the case of a large image such as an 8K×4K image, quantization matrix switch 2030 basically uses a defined quantization matrix set which has been set on a per sequence basis or on a per picture basis. In addition, when a natural image and an artificial image are present in the same picture, encoding apparatus 2000 adds information indicating update of a defined quantization matrix set to the slice header of a slice which firstly appears at or after the boundary between the both images. With this update, quantization matrix switch 2030 changes the priority ranks of the defined quantization matrix sets for artificial images and for natural images so that the defined quantization matrix set for artificial images is indicated by the smaller-value selection index than the defined quantization matrix set for natural images. In other words, quantization matrix switch 2030 changes the priority rank of the defined quantization matrix set for artificial images to the higher priority rank. As a result, the smaller-value selection index is assigned to the defined quantization matrix set for artificial images having the high priority rank. In this way, quantization matrix switch 2030 reorders the selection indices of the respective defined quantization matrix sets in accordance with the changed priority ranks.

In addition, for example, quantization matrix switch 2030 may update the association between each defined quantization matrix set and the corresponding selection index so that a defined quantization matrix set having a higher occurrence frequency has a smaller-value selection index, while fixing the possible value of the selection index. With this configuration, it is possible to change the priority rank of the defined quantization matrix set having the high occurrence frequency to a higher priority rank, associate the defined quantization matrix set with the smaller-value selection index in advance, and to thereby reduce the amount of codes.

In addition, quantization matrix switch 2030 may hold, as a defined quantization matrix set, a quantization matrix set including a quantization matrix (a flat quantization matrix) for performing quantization on the respective frequency components using the same quantization value. In this way, quantization matrix switch 2030 holds two or more kinds of defined quantization matrix sets each of which does not include any flat quantization matrix, in addition to the defined quantization matrix set including the flat quantization matrix. Subsequently, quantization matrix switch 2030 switches each of the three or more kinds of defined quantization matrix sets to a use quantization matrix set. With the use of the selection index, it is possible to perform quantization on the respective frequency components using the same value utilizing the selection index without adding a custom quantization matrix set to a bitstream, and thus to reduce the amount of information.

Although the quantization matrix switching information including the switching flag and the selection index is used in this embodiment, it is to be noted that other information may be used as quantization matrix switching information. In other words, any information (identification information) based on which one quantization matrix set can be selected from a plurality of defined quantization matrix sets and a custom quantization matrix set may be used as such quantization matrix switching information.

For example, although quantization matrix switch 2030 according to this embodiment includes two kinds of switches which are defined matrix selector 3015 and custom/defined switch 3010, quantization matrix switch 2030 may include a single switch in which the two kinds of switches are integrated. At this time, selection index of 0 associated with the custom quantization matrix set and selection indices of 1 or larger associated with each of the plurality of defined quantization matrix sets are used. With this, it is possible to switch quantization matrix sets directly based on the selection indices, and to reduce the processing amount in encoding processing.

It is to be noted that the number of quantization matrices included in a defined quantization matrix set may vary for each quantization mode. For example, two kinds of quantization matrices are defined for a block having a 4×4 size, and three kinds of quantization matrices are defined for a block having an 8×8 size or lager. When a plurality of quantization matrices are defined in accordance with image quality, two kinds of quantization matrices for low rates and for high image quality are defined for a small block having, for example, a 4×4 size. Subsequently, three kinds of quantization matrices for low rates, for normal image quality (normal rates), and for high image quality are defined for a block having an 8×8 size or larger. A quantization matrix for normal image quality is a quantization matrix for quantizing high-frequency components at an approximately intermediate quantization degree which is between the degrees of quantization performed by the other two kinds of quantization matrices. Since an influence range of image deterioration becomes larger as the size of a block is larger, and the preparation of the quantization matrices for low rates, for normal images, and for high quality images makes it possible to increase subjective images more flexibly.

Although descriptions are given of the configuration in which frequency transform is performed on an input image in the present disclosure, it is to be noted that configurations are not limited thereto. For example, it is also good to generate a prediction image similar to an input image using encoded image information, and perform frequency transform on a difference image which is a difference between the input image and a prediction image. Furthermore, it is also good to divide the input image and the difference image into blocks having a particular size (example: 16×16 pixels), and perform frequency transform on the blocks.

It is to be noted that, in the quantization matrix setting processing of Steps S101 and S102 in this embodiment, switching and setting of the plurality of quantization matrices are performed collectively on a per quantization matrix set basis irrespective of a quantization mode. However, switching and setting of the plurality of quantization matrices may be performed on a per unit basis selected by a quantization mode. In this case, encoding apparatus 2000 may assign a flag indicating whether or not to use a custom quantization matrix for each unit selected by the quantization mode. In addition, when all of the values included in the custom quantization matrix are set to a defined value (for example, 1), encoding apparatus 2000 may switch quantization matrices by selecting one of the plurality of defined quantization matrices. With this, the use of the custom quantization matrix can be limited only to a special case where a particular quantization matrix is used only for a large block, which makes it possible to enhance subjective image quality.

Embodiment 2

One of embodiments that is a decoding apparatus which performs a decoding method according to the present disclosure is described with reference to FIGS. 10 to 13. It is to be noted that descriptions for details similar to the details described in Embodiment 1 may be omitted below.

Figure 10:
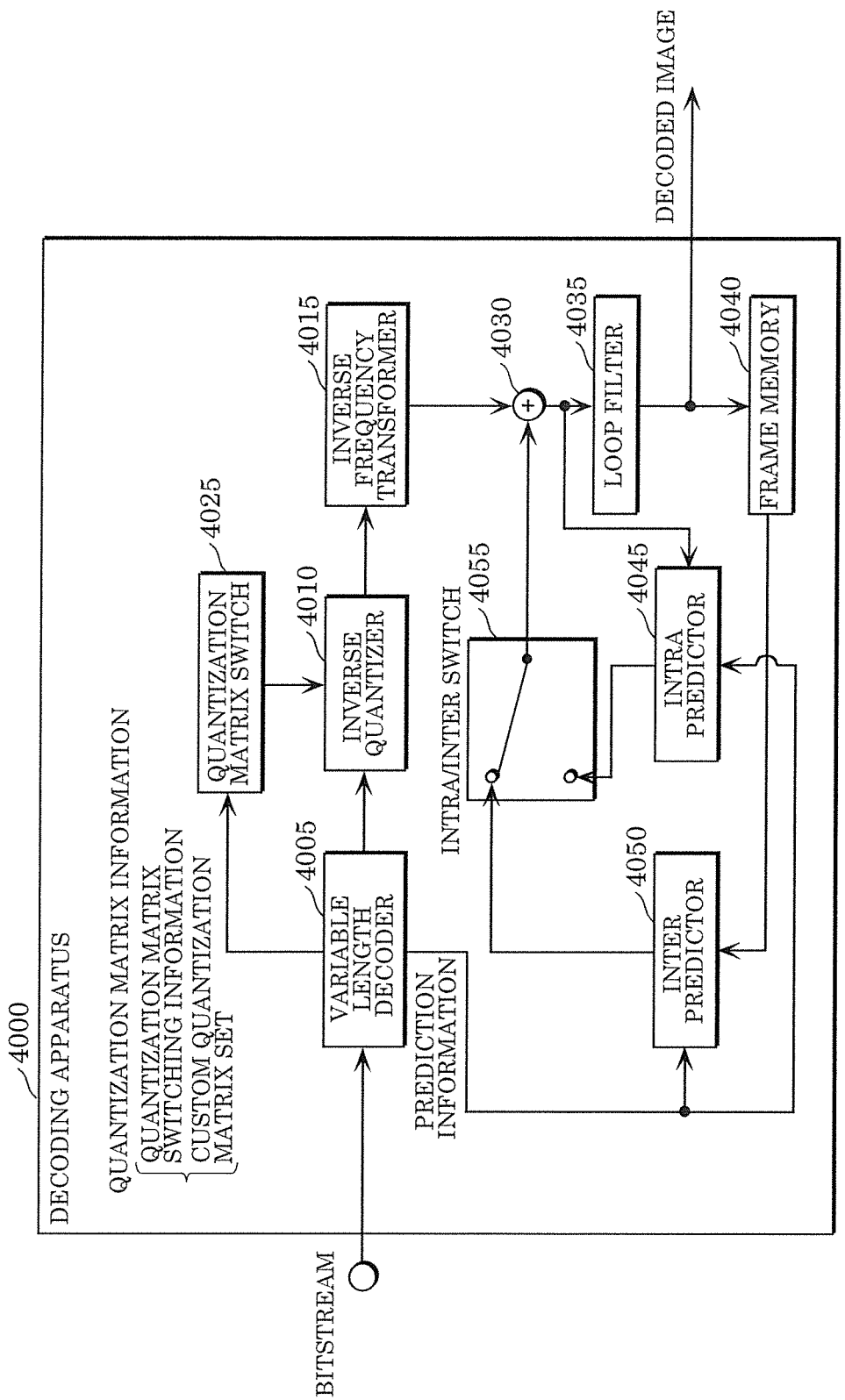
FIG. 10 is a block diagram illustrating an example of a configuration of a decoding apparatus according to Embodiment 2.

FIG. 10 is a block diagram illustrating an example of a configuration of the decoding apparatus according to Embodiment 2.

Decoding apparatus 4000 includes variable length decoder 4005, inverse quantizer 4010, inverse frequency transformer 4015, quantization matrix switch 4025, adder 4030, loop filter 4035, frame memory 4040, intra predictor 4045, inter predictor 4050, and intra/inter switch 4055.

Decoding apparatus 4000 decodes an input bitstream, that is, decodes an encoded image included in the bitstream on a per block basis, to generate a decoded image. Decoding apparatus 4000 according to this embodiment decodes the bitstream generated by encoding apparatus 2000 according to Embodiment 1.

At this time, variable length decoder 4005 performs variable length decoding on the bitstream to obtain quantization matrix information on a per sequence basis and on a per picture basis from the bitstream. Quantization matrix information includes at least quantization matrix switching information, and may include a custom quantization matrix set. Furthermore, variable length decoder 4005 performs variable length decoding on the bitstream to obtain prediction information and a plurality of quantization coefficients. Inverse quantizer 4010 performs inverse quantization on the plurality of quantization coefficients using the quantization matrix output from quantization matrix switch 4025, to obtain a plurality of frequency coefficients. Inverse frequency transformer 4015 performs inverse frequency transform on the plurality of frequency coefficients to reconstruct a difference block. Adder 4030 adds the prediction block generated by either intra predictor 4045 or inter predictor 4050 and the difference block to generate a decoded image. Loop filter 4035 performs filtering for reducing influence of encoding on the generated decoded image, and stores the decoded image subjected to the filtering in frame memory 4040. This filtering is, for example, filtering using a deblocking filter for removing distortion at block boundaries. Intra predictor 4045 performs intra prediction using prediction information and a decoded image generated by adder 4030 to generate a prediction block for the target block. Inter predictor 4050 performs inter prediction using prediction information and the decoded image stored in frame memory 4040 to generate a prediction block for the target block.

Intra/inter switch 4055 switches prediction blocks to be output to adder 4030 to the prediction block generated through the intra prediction and the prediction block generated through the inter prediction.

Upon obtaining the quantization matrix switching information included in the quantization matrix information, quantization matrix switch 4025 selects any one of the plurality of quantization matrix sets based on the quantization matrix switching information. Subsequently, quantization matrix switch 4025 sets the selected quantization matrix set as a use quantization matrix set.

In addition, upon obtaining the custom quantization matrix set included in the quantization matrix information, quantization matrix switch 2030 selects the custom quantization matrix set from the plurality of quantization matrix sets. Subsequently, quantization matrix switch 4025 sets the selected custom quantization matrix set as a use quantization matrix set. Hereinafter, selecting and setting a quantization matrix set is referred to as quantization matrix setting processing. Subsequently, quantization matrix switch 4025 outputs the quantization matrices included in the use quantization matrix set to inverse quantizer 4010. It is to be noted that quantization matrix switch 4025 includes the same configuration as quantization matrix switch 2030 according to Embodiment 1.

Figure 11:
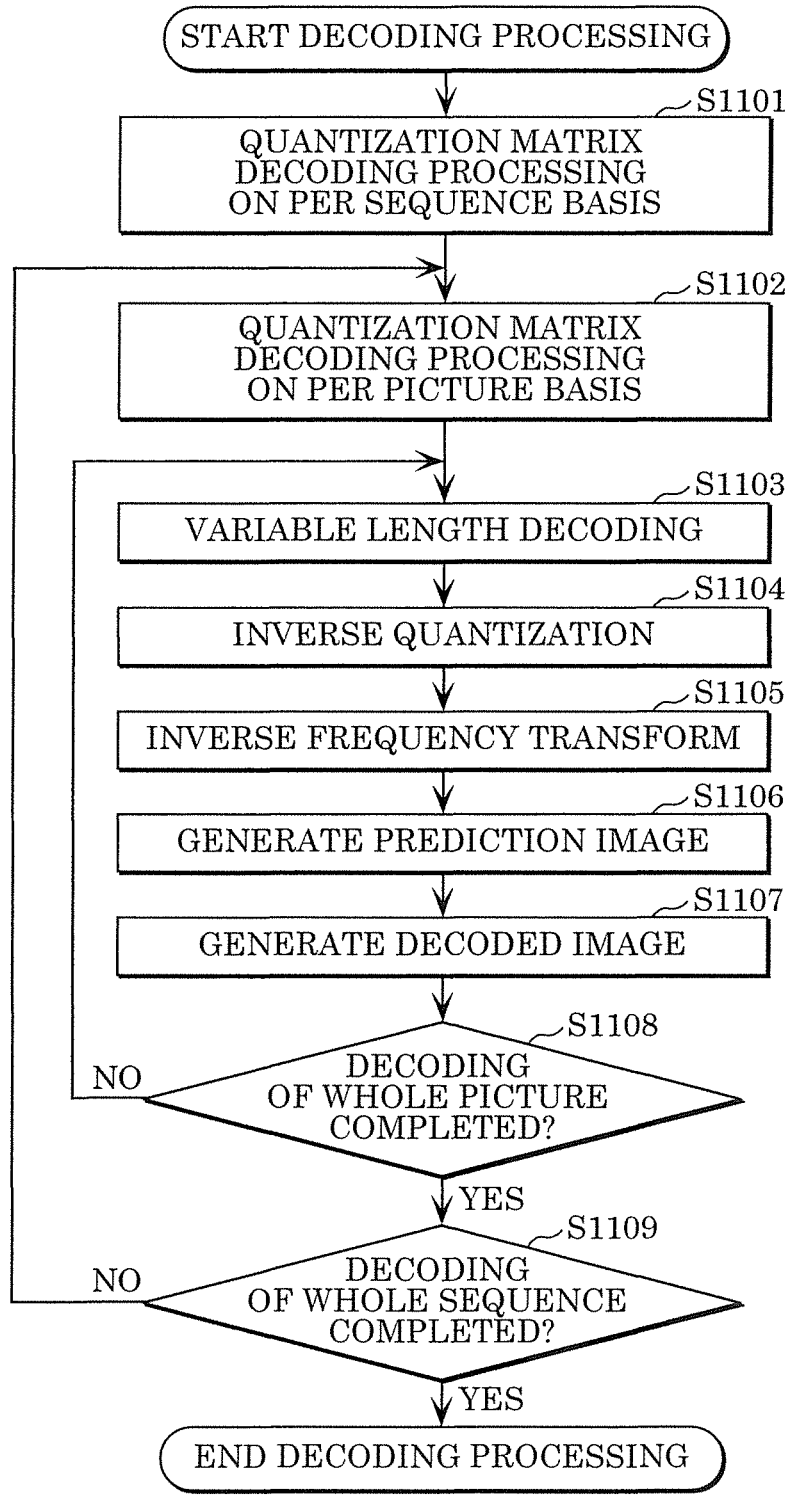
FIG. 11 is a flowchart illustrating examples of processing operations performed by the decoding apparatus according to Embodiment 2.

FIG. 11 is a flowchart illustrating an example of decoding processing according to Embodiment 2.

Variable length decoder 4005 and quantization matrix switch 4025 perform quantization matrix decoding processing on a bitstream on a per sequence basis (S1101). The quantization matrix decoding processing includes decoding of quantization matrix information performed on a per sequence basis and quantization matrix setting processing. Subsequently, variable length decoder 4005 and quantization matrix switch 4025 perform quantization matrix decoding processing on a per picture basis (S1102). The quantization matrix decoding processing includes decoding of quantization matrix information performed on a per picture basis and quantization matrix setting processing.

Next, variable length decoder 4005 performs variable length decoding on the bitstream to obtain prediction information and a plurality of quantization coefficients (S1103).

In this embodiment, the target block included in the bitstream and identification information (quantization matrix switching information) are decoded in Steps S1101, S1102, and S1103. The identification information has been encoded in association with the target block and is for identifying a quantization matrix set to be used to perform inverse quantization on the target block. The quantization matrix set includes the plurality of quantization matrices.

Inverse quantizer 4010 performs inverse quantization on the respective quantization coefficients obtained in Step S1103 (S1104). Inverse frequency transformer 4015 performs inverse frequency transform on the plurality of frequency coefficients obtained through the inverse quantization in Step S1104 to reconstruct a difference block (S1105). Intra predictor 4045, inter predictor 4050, and intra/inter switch 4055 generate a prediction block using an already generated decoded image (S1106). Adder 4030 generates a decoded image using the difference block reconstructed in Step S1105 and the prediction block generated in Step S1106 (S1107). Decoding apparatus 4000 determines whether or not the processing in Steps S1103 to S1107 have been performed on the whole picture, that is, whether or not decoding of the whole picture has been completed (S1108). Here, when it is determined that decoding of the whole picture has not yet been completed (No in S1108), decoding apparatus 4000 repeats the processing starting with Step S1103. On the other hand, when it is determined that decoding of the whole picture has been completed (Yes in S1108), decoding apparatus 4000 determines whether or not decoding of the whole sequence has been completed (S1109). Here, when it is determined that decoding of the whole sequence has not yet been completed (No in S1109), decoding apparatus 4000 repeats the processing starting with Step S1102. On the other hand, when decoding of the whole sequence has been completed (Yes in S1109), decoding apparatus 4000 ends the decoding processing for the bitstream performed on a per sequence basis.

Figure 12:
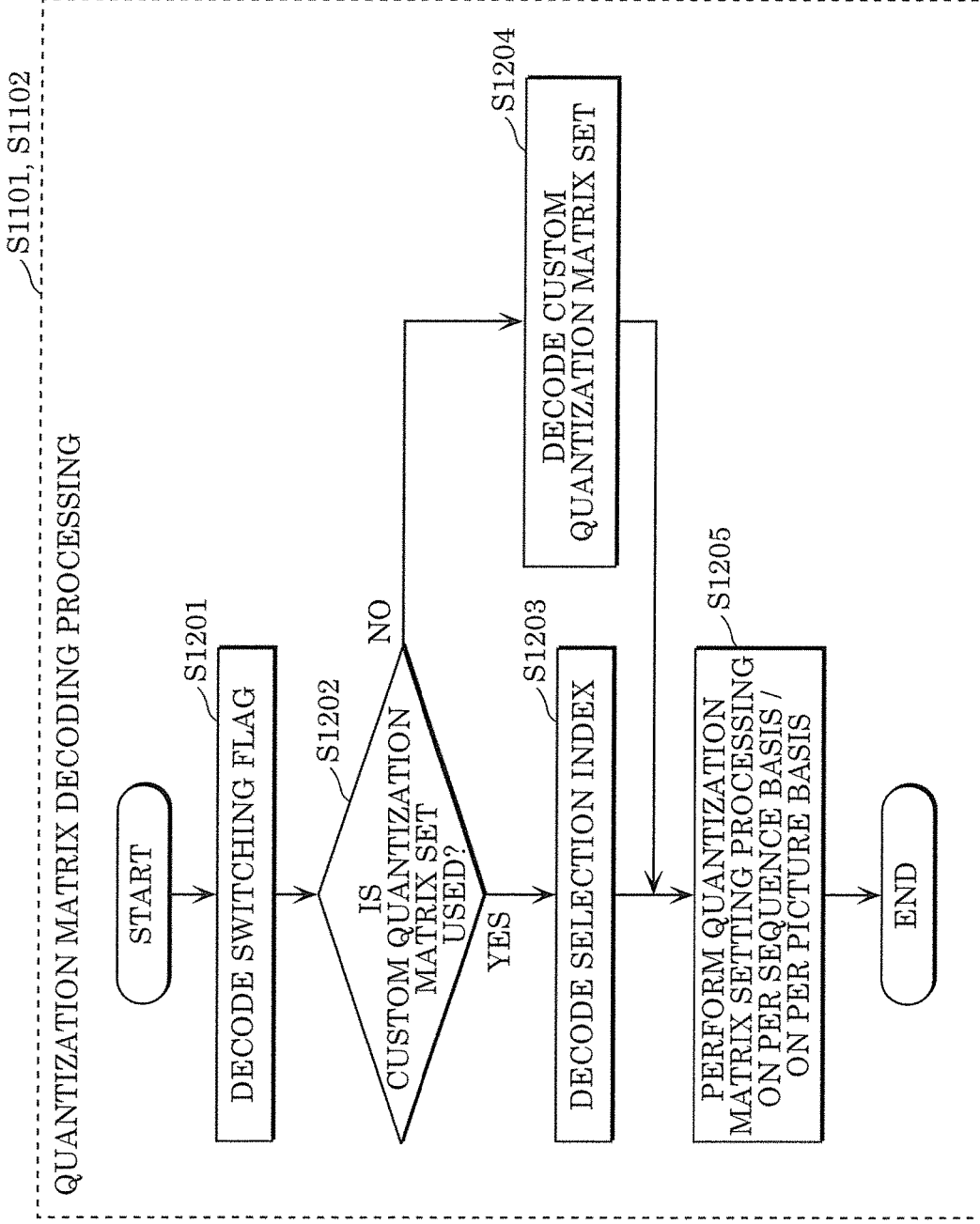
FIG. 12 is a flowchart illustrating an example of quantization matrix decoding processing according to Embodiment 2.

FIG. 12 is a flowchart of quantization matrix decoding processing in Steps S1101 and S1102 illustrated in FIG. 11. It is to be noted that the quantization matrix decoding processing in Step S1101 and the quantization matrix decoding processing in Step S1102 are the same except for whether the processing is performed on a per sequence basis or on a per picture basis.

First, variable length decoder 4005 decodes (performs variable length decoding on) a switching flag subjected to variable length encoding and included in the bitstream (S1201). Next, variable length decoder 4005 determines whether or not a custom quantization matrix (a custom quantization matrix set) is used, based on the decoded switching flag (S1202). Here, when determining not to use the custom quantization matrix (No in S1202), variable length decoder 4005 decodes (performs variable length decoding on) a selection index subjected to variable length encoding and included in the bitstream (S1203). In this way, the quantization matrix switching information including the switching flag and the selection index are obtained as quantization matrix information.

On the other hand, when determining to use the custom quantization matrix, variable length decoder 4005 decodes (performs variable length decoding on) the custom quantization matrix set subjected to variable length encoding and included in the bitstream (S1204). In this way, the quantization matrix information including (i) the quantization matrix switching information composed only of the switching flag and (ii) the custom quantization matrix set is obtained.

Next, quantization matrix switch 4025 performs the quantization matrix setting processing (S1205) using the quantization matrix information obtained through Step S1201, and Step S1203 or Step S1204 (S1205). At this time, in the quantization matrix decoding processing performed on a per sequence basis in Step S1101 illustrated in FIG. 11, quantization matrix switch 4025 performs the quantization matrix setting processing on a per sequence basis. At this time, in the quantization matrix decoding processing performed on a per picture basis in Step S1102 illustrated in FIG. 11, quantization matrix switch 4025 performs the quantization matrix setting processing on a per picture basis. The quantization matrix setting processing performed on a per sequence basis and the quantization matrix setting processing performed on a per picture basis are the same as the processing in Steps S101 and S102 illustrated in FIG. 2. In other words, quantization matrix switch 4025 sets the quantization matrix set identified by the quantization matrix switching information which is identification information. In addition, in the quantization matrix setting processing, quantization matrix switch 4025 selects, as a use quantization matrix set, any one of the custom quantization matrix set and the plurality of defined quantization matrix sets A to C illustrated in FIG. 5.

At this time, in this embodiment, the switching flag (switching information) indicating whether or not to use the custom quantization matrix set and included in the quantization matrix switching information (identification information) is decoded in Step S1201. Subsequently, in Step S1205, based on the switching flag, either the custom quantization matrix set or any one of the plurality of defined quantization matrix sets A to C is selected as the quantization matrix set to be used to perform inverse quantization on the target block.

Figure 13:
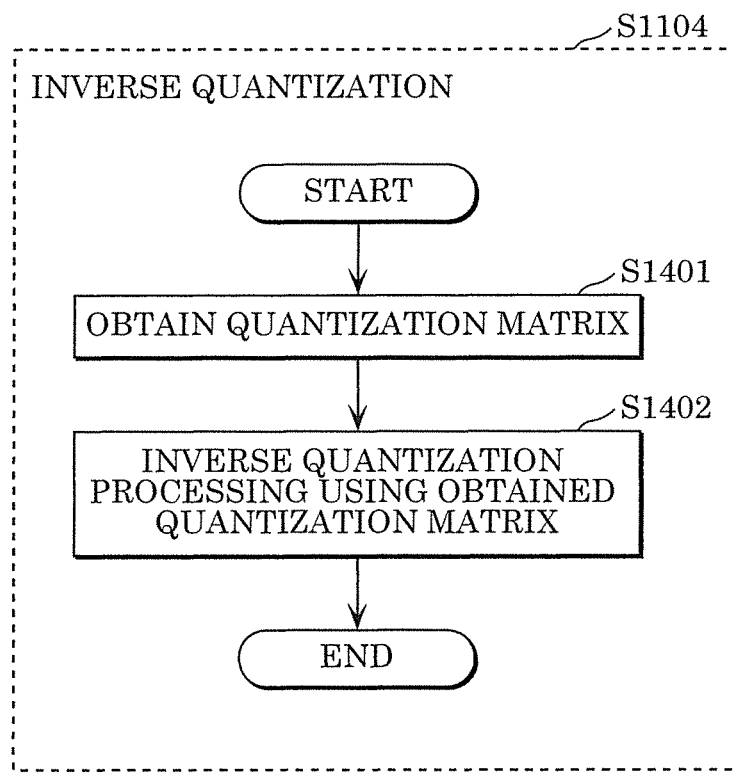
FIG. 13 is a flowchart illustrating an example of inverse quantization according to Embodiment 2.

FIG. 13 is a flowchart of inverse quantization in Step S1104 illustrated in FIG. 11.

First, inverse quantizer 4010 obtains the quantization matrix to be used for inverse quantization (S1401). More specifically, inverse quantizer 4010 obtains the quantization matrix included in the use quantization matrix set which has been set in Step S1101 or Step S1102. At this time, as in the quantization in Step S107 illustrated in FIG. 2, inverse quantizer 4010 may obtain a different quantization matrix for each quantization mode. Alternatively, inverse quantizer 4010 may perform inverse quantization in which no quantization matrix may be used, by using a switching flag indicating whether or not to use a quantization matrix.

Next, inverse quantizer 4010 performs inverse quantization using the obtained quantization matrix (S1402).

For example, in this embodiment, inverse quantizer 4010 selects the quantization matrix corresponding to the size of the target block from the use quantization matrix set which has been set, and performs inverse quantization using the selected quantization matrix.

(Effects)

As described above, the decoding method according to this embodiment includes a decoding step, a setting step, and an inverse quantization step. In the decoding step, a target block in a bitstream and quantization matrix switching information (identification information) are decoded. The quantization matrix switching information has been encoded in association with the target block and is for identifying a quantization matrix set to be used to perform inverse quantization on the target block. The quantization matrix set includes a plurality of quantization matrices. In the setting step, a quantization matrix set identified by the quantization matrix switching information is set. In the inverse quantization step, the inverse quantization on the target block which has been decoded is performed using a quantization matrix selected based on a feature of the target block from the quantization matrix set which has been set. In addition, in the setting step, a quantization matrix set selected based on the quantization matrix switching information from a plurality of quantization matrix sets is set as the quantization matrix set to be used to perform the inverse quantization on the target block. The plurality of quantization matrix sets include a first quantization matrix set included in the bitstream and a plurality of second quantization matrix sets which have been respectively defined in advance. In addition, each of the plurality of second quantization matrix sets includes a quantization matrix having quantization values different from quantization values of a quantization matrix included in any other one of the plurality of second quantization matrix sets. In addition, in the decoding, when the quantization matrix set identified by the quantization matrix switching information is the custom quantization matrix set, the custom quantization matrix set included in the bitstream is further decoded.

In this way, the custom quantization matrix set and the quantization matrix set selected from the plurality of defined quantization matrix sets are set as quantization matrix sets to be used in inverse quantization. Accordingly, with the presence of the plurality of defined quantization matrix sets, it is possible to reduce the frequency at which the custom quantization matrix set is selected. Furthermore, while the custom quantization matrix set is decoded when the custom quantization matrix set is set, the defined quantization matrix set is defined in advance and thus is not decoded when the defined quantization matrix set is selected. Accordingly, it is possible to increase the frequency at which the defined quantization matrix set is set, which reduces the amount of codes. Furthermore, since each of the plurality of defined quantization matrix sets includes a quantization matrix having quantization values different from quantization values of a quantization matrix included in any other one of the plurality of second quantization matrix sets, it is possible to prevent decrease in image quality when any one of the defined quantization matrix sets is set.

In other words, it is possible to appropriately decode the bitstream which has been generated through the encoding using the plurality of defined quantization matrix sets and includes the information which specifies these defined quantization matrix sets. In addition, in this embodiment, it is possible to appropriately decode the bitstream which makes it possible to select the use quantization matrix set from the plurality of defined quantization matrix sets and use the selected use quantization matrix set only requiring a small amount of information. In other words, it is possible to use the quantization matrix suitable for the feature and compression rate of the image only requiring the small amount of information, and to reproduce the image having an enhanced subjective image quality.

Although the selection index is decoded in Step S1203 in this embodiment, it is to be noted that the selection index does not always need to be present in the bitstream. For example, a rule related to a case where no selection index is present is determined in advance. When no selection index is present in Step S1203, decoding apparatus 4000 obtains a selection index according to the rule. For example, decoding apparatus 4000 obtains 0 as the selection index. In addition, when the information indicating the rule is included in the bitstream, decoding apparatus 4000 may extract the information from the bitstream and obtain the selection index using the information. This eliminates the need to include the selection indices on a per sequence basis or on a per picture basis to the bitstream. Thus, reduction in the amount of information can be expected.

As in Embodiment 1, it is to be noted that the number of defined quantization matrix sets may be any number of kinds as long as the number is two or more. In other words, quantization matrix switch 4025 holds a defined quantization matrix set which includes a flat quantization matrix and also two or more kinds of quantization matrix sets which do not include any flat quantization matrix, as in the case of quantization matrix switch 2030 according to Embodiment 1.

In addition, as in Embodiment 1, quantization matrix switch 4025 may include two kinds of switches, or may include a single switch in which the two kinds of switches are integrated. In addition, the number of quantization matrices included in a defined quantization matrix set may vary for each quantization mode. In addition, quantization matrix switch 4025 may switch quantization matrices in a unit selected in a quantization mode instead of switching quantization matrix sets. In addition, decoding apparatus 4000 may decode information (update information) related to update of the priority ranks as illustrated in Embodiment 1 from a slice header or the like, and update the priority ranks and switch use quantization matrix sets according to the update information.

In this way, also in this embodiment, as in Embodiment 1, quantization matrix switch 4025 may select any one of the plurality of quantization matrix sets according to the priority ranks assigned respectively to the plurality of defined quantization matrix sets. In addition, quantization matrix switch 4025 may change the priority ranks assigned respectively to the plurality of defined quantization matrix sets.

In addition, when the update information is not appropriate, decoding apparatus 4000 may ignore the update information without switching use quantization matrix sets. Alternatively, decoding apparatus 4000 may change the priority rank of one of the default matrices to a predetermined priority rank by, for example, changing the priority rank of the default matrix to the highest priority rank.

When appropriate information is not added to a bitstream, specifically for example, when a value which exceeds a possible value for a selection index is added thereto, decoding apparatus 4000 may use the default matrix or the quantization matrix set for low bit rates.

Each of the embodiments has been described above as an example of a technique in the present disclosure. For this reason, the attached drawings and detailed descriptions are provided.

Accordingly, the constituent elements illustrated in the attached drawings and described in DETAILED DESCRIPTION OF THE EMBODIMENT may include not only constituent elements which are essential to solve the problem but also constituent elements which are not essential to solve the problem and provided to illustrate the technique. For this reason, these inessential constituent elements should not be regarded as essential ones directly because the inessential constituent elements are illustrated in the attached drawings and described in DETAILED DESCRIPTION OF THE EMBODIMENT.

Figure 14A:
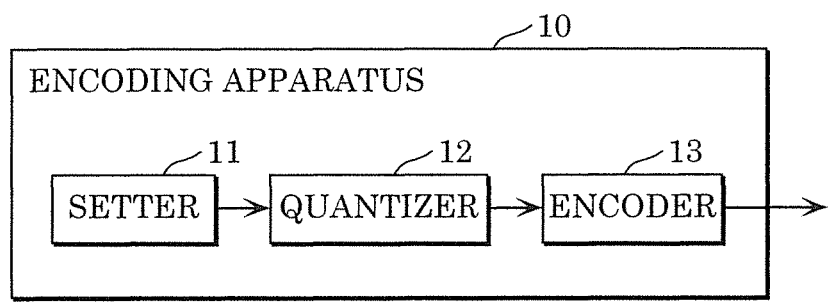
FIG. 14A is a block diagram illustrating an example of a configuration of an encoding apparatus according to an aspect of the present invention.

For example, although encoding apparatus 2000 according to Embodiment 1 includes intra predictor 2050 and inter predictor 2065, encoding apparatus 2000 does not always need to include intra predictor 2050 and inter predictor 2065 as in FIG. 14A.

FIG. 14A is a block diagram illustrating an example of a configuration of an encoding apparatus according to an aspect of the present invention.

Encoding apparatus 10 is an encoding apparatus which encodes an image on a per block basis, and includes setter 11, quantizer 12, and encoder 13. Setter 11 sets a quantization matrix set to be used to perform quantization on a target block. The quantization matrix set includes a plurality of quantization matrices. Quantizer 12 performs the quantization on the target block using a quantization matrix selected based on a feature of the target block from the quantization matrix set which has been set. Encoder 13 encodes, in a mutually associated manner, the target block which has been subjected to the quantization and identification information for identifying the quantization matrix set which has been set. In addition, setter 11 sets a quantization matrix as the quantization matrix set to be used to perform the quantization on the target block. The quantization matrix set is selected from a plurality of quantization matrix sets. The plurality of quantization matrix sets includes a first quantization matrix set which is arbitrarily specified and a plurality of second quantization matrix sets which have been respectively defined in advance. In addition, each of the plurality of second quantization matrix sets includes a quantization matrix having quantization values different from quantization values of a quantization matrix included in any other one of the plurality of second quantization matrix sets. In addition, when the quantization matrix set which has been set is the first quantization matrix set, encoder 13 further encodes the first quantization matrix.

Even such encoding apparatus 10 can provide the same advantageous effects as provided by encoding apparatus 2000 according to Embodiment 1.

Figure 14B:
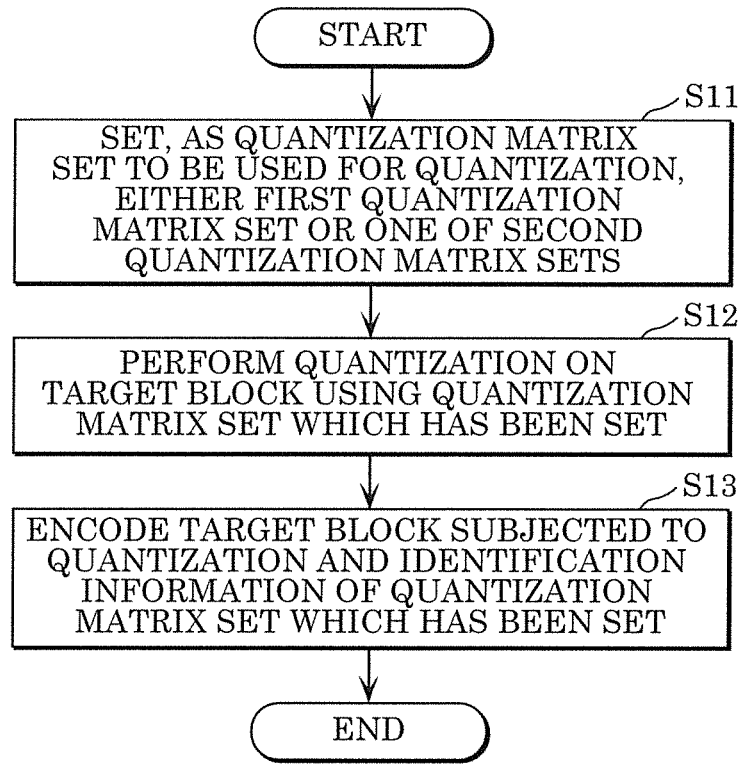
FIG. 14B is a flowchart illustrating an example of an encoding method according to an aspect of the present invention.

In addition, the encoding method according to Embodiment 1 includes generation of a prediction block (S104 in FIG. 2), the processing does not need to be included as in FIG. 14B.

FIG. 14B is a flowchart illustrating an example of an encoding method according to an aspect of the present invention.

This encoding method is an encoding method for encoding an image on a per block basis, and includes setting step S11, quantization step S12, and encoding step S13. In setting step S11, a quantization matrix set to be used to perform quantization on a target block is set. The quantization matrix set includes a plurality of quantization matrices. In quantization step S12, the quantization on the target block is performed using a quantization matrix selected based on a feature of the target block from the quantization matrix set which has been set. In encoding step 13, the target block which has been subjected to the quantization and identification information for identifying the quantization matrix set which has been set are encoded in a mutually associated manner. In addition, in setting step S11, a quantization matrix is set as the quantization matrix set to be used to perform the quantization on the target block. The quantization matrix set is selected from a plurality of quantization matrix sets. The plurality of quantization matrix sets includes a first quantization matrix set which is arbitrarily specified and a plurality of second quantization matrix sets which have been respectively defined in advance. In addition, each of the plurality of second quantization matrix sets includes a quantization matrix having quantization values different from quantization values of a quantization matrix included in any other one of the plurality of second quantization matrix sets. In addition, in encoding step S13, when the quantization matrix set which has been set is the first quantization matrix set, the first quantization matrix is further encoded.

Even such encoding method can provide the same advantageous effects as provided by the encoding method according to Embodiment 1.

Figure 15A:
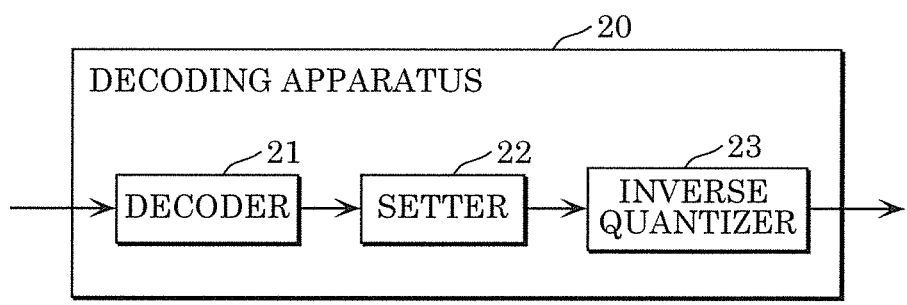
FIG. 15A is a block diagram illustrating an example of a configuration of a decoding apparatus according to an aspect of the present invention.

In addition, decoding apparatus 4000 according to Embodiment 2 includes intra predictor 4045 and inter predictor 4050, decoding apparatus 4000 does not always need to include intra predictor 4045 and inter predictor 4050 as in FIG. 15A.

FIG. 15A is a block diagram illustrating an example of a configuration of a decoding apparatus according to an aspect of the present invention.

Decoding apparatus 20 is a decoding apparatus which decodes an encoded image in a bitstream on a per block basis, and includes decoder 21, setter 22, and inverse quantizer 23. Decoder 21 decodes a target block in the bitstream and identification information. The identification information has been encoded in association with the target block and is for identifying a quantization matrix set to be used to perform inverse quantization on the target block. The quantization matrix set includes a plurality of quantization matrices. Setter 22 sets a quantization matrix set identified by the identification information. Inverse quantizer 23 performs the inverse quantization on the target block which has been decoded, using a quantization matrix selected based on a feature of the target block from the quantization matrix set which has been set. In addition, setter 22 sets a quantization matrix set as the quantization matrix set to be used to perform the inverse quantization on the target block, the quantization matrix being selected based on the identification information from a plurality of quantization matrix sets, the plurality of quantization matrix sets including a first quantization matrix set included in the bitstream and a plurality of second quantization matrix sets which have been respectively defined in advance. In addition, each of the plurality of second quantization matrix sets includes a quantization matrix having quantization values different from quantization values of a quantization matrix included in any other one of the plurality of second quantization matrix sets. In addition, when the quantization matrix set identified by the identification information is the first quantization matrix set, decoder 21 further decodes the first quantization matrix set included in the bitstream.

Even such decoding apparatus 20 can provide the same advantageous effects as provided by decoding apparatus 4000 according to Embodiment 2.

Figure 15B:
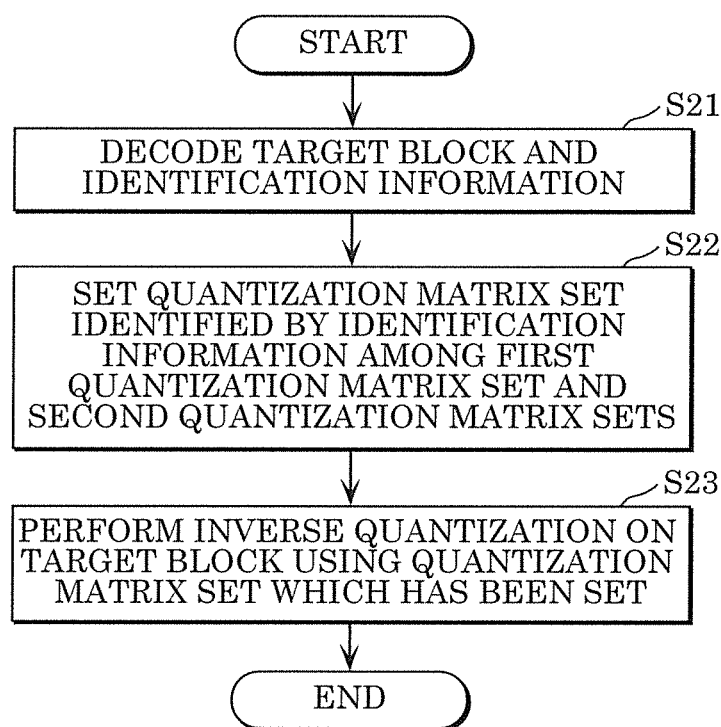
FIG. 15B is a flowchart illustrating an example of a decoding method according to an aspect of the present invention.

In addition, the decoding method according to Embodiment 2 includes generation of a prediction block (S1106 in FIG. 11), the processing does not need to be included as in FIG. 15B.

FIG. 15B is a flowchart illustrating an example of a decoding method according to an aspect of the present invention.

The decoding method is a decoding method for decoding an encoded image in a bitstream on a per block basis, and includes decoding step S21, setting step S22, and inverse quantization step S23. In decoding step S21, a target block in the bitstream and identification information are decoded. The identification information has been encoded in association with the target block and is for identifying a quantization matrix set to be used to perform inverse quantization on the target block. The quantization matrix set includes a plurality of quantization matrices. In setting step S22, a quantization matrix set identified by the identification information is set. In inverse quantization step S23, the inverse quantization on the target block which has been decoded is performed using a quantization matrix selected based on a feature of the target block from the quantization matrix set which has been set. In addition, in setting step S22, a quantization matrix set is set as the quantization matrix set to be used to perform the inverse quantization on the target block. The quantization matrix is selected based on the identification information from a plurality of quantization matrix sets. The plurality of quantization matrix sets includes a first quantization matrix set included in the bitstream and a plurality of second quantization matrix sets which have been respectively defined in advance. In addition, each of the plurality of second quantization matrix sets includes a quantization matrix having quantization values different from quantization values of a quantization matrix included in any other one of the plurality of second quantization matrix sets. In addition, since the above embodiment has been provided to illustrate the technique according to the present disclosure, it is possible to make various kinds of modification, replacement, addition, omission etc. within the scope of the claims or equivalents.

In addition, since the above embodiment has been provided to illustrate the technique according to the present disclosure, it is possible to make various kinds of modification, replacement, addition, omission etc. within the scope of the claims or equivalents.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 16:
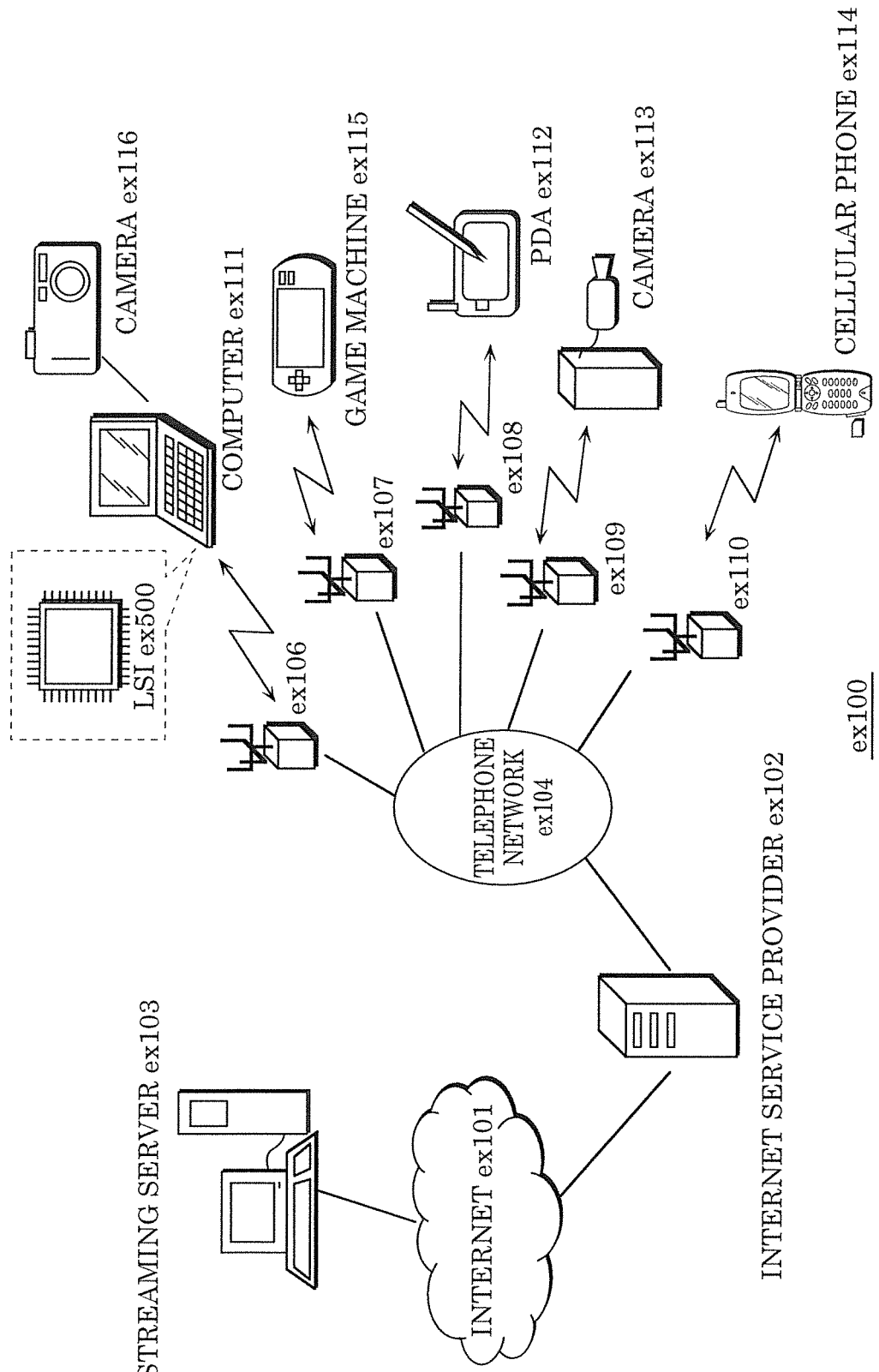
FIG. 16 shows an overall configuration of a content providing system for implementing content distribution services.

FIG. 16 illustrates an overall configuration of content providing system ex100 for implementing content distribution services. The area for providing communication services is divided into cells of desired size, and base stations ex106, ex107, ex108, ex109, and ex110 which are fixed wireless stations are placed in each of the cells.

Content providing system ex100 is connected to devices, such as computer ex111, personal digital assistant (PDA) ex112, camera ex113, cellular phone ex114 and game machine ex115, via Internet ex101, Internet service provider ex102, telephone network ex104, as well as base stations ex106 to ex110, respectively.

However, the configuration of content providing system ex100 is not limited to the configuration shown in FIG. 16, and a combination in which any of the elements can be connected is acceptable. In addition, each device may be directly connected to telephone network ex104, rather than via base stations ex106 to ex110 which are the fixed wireless stations. Furthermore, the devices may be interconnected to each other via a short distance wireless communication and others.

Camera ex113, such as a digital video camera, is capable of capturing video. Camera ex116, such as a digital camera, is capable of capturing both still images and video. Furthermore, cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, cellular phone ex114 may be a Personal Handyphone System (PHS).

In content providing system ex100, streaming server ex103 is connected to camera ex113 and others via telephone network ex104 and base station ex109, which enables distribution of images of a live show and others. In such a distribution, a content (for example, video of a music live show) captured by the user using camera ex113 is encoded as described above in each of embodiments (i.e., the camera functions as the image encoding apparatus according to an aspect of the present invention), and the encoded content is transmitted to streaming server ex103. On the other hand, streaming server ex103 carries out stream distribution of the transmitted content data to the clients upon their requests. The clients include computer ex111, PDA ex112, camera ex113, cellular phone ex114, and game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by camera ex113 or streaming server ex103 that transmits the data, or the encoding processes may be shared between camera ex113 and streaming server ex103. Similarly, the distributed data may be decoded by the clients or streaming server ex103, or the decoding processes may be shared between the clients and streaming server ex103. Furthermore, the data of the still images and video captured by not only camera ex113 but also camera ex116 may be transmitted to streaming server ex103 through computer ex111. The encoding processes may be performed by camera ex116, computer ex111, or streaming server ex103, or shared among them.

Furthermore, the coding processes may be performed by LSI ex500 generally included in each of computer ex111 and the devices. LSI ex500 may be configured of a single chip or a plurality of chips. Software for coding video may be integrated into some type of a recording medium (such as a CD-ROM, a flexible disk, and a hard disk) that is readable by computer ex111 and others, and the coding processes may be performed using the software. Furthermore, when cellular phone ex114 is equipped with a camera, the video data obtained by the camera may be transmitted. The video data is data encoded by LSI ex500 included in cellular phone ex114.

Furthermore, streaming server ex103 may be composed of servers and computers, and may decentralize data and process the decentralized data, record, or distribute data.

As described above, the clients may receive and reproduce the encoded data in content providing system ex100. In other words, the clients can receive and decode information transmitted by the user, and reproduce the decoded data in real time in content providing system ex100, so that the user who does not have any particular right and equipment can implement personal broadcasting.

Figure 17:
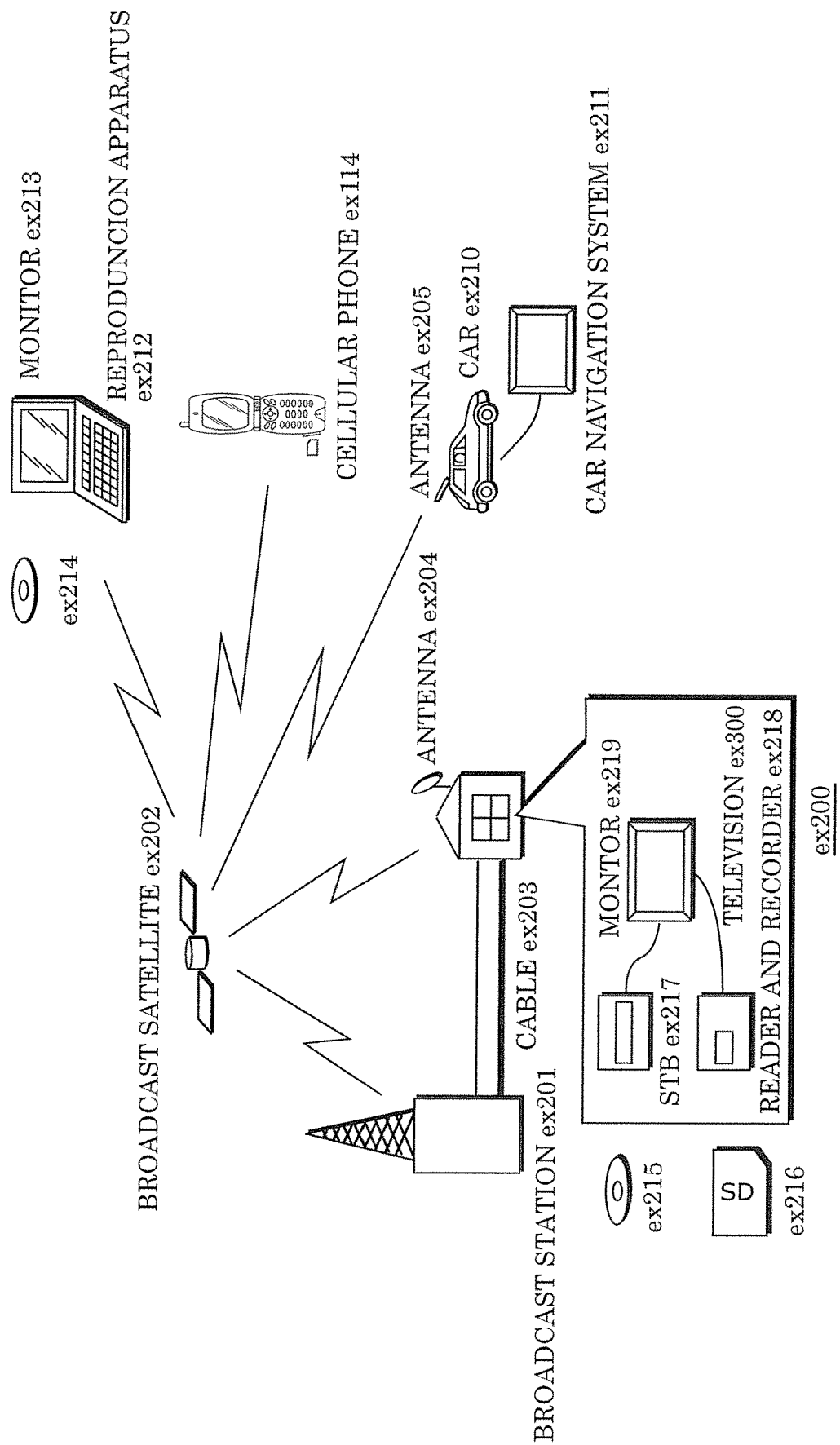
FIG. 17 shows an overall configuration of a digital broadcasting system.

Aside from the example of content providing system ex100, at least one of the moving picture coding apparatus (image coding apparatus) described in each of embodiments may be implemented in digital broadcasting system ex200 illustrated in FIG. 17. More specifically, broadcast station ex201 communicates or transmits, via radio waves to broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, broadcast satellite ex202 transmits radio waves for broadcasting. Then, home-use antenna ex204 with a satellite broadcast reception function receives the radio waves. Next, a device such as television (receiver) ex300 and set top box (STB) ex217 decodes the received multiplexed data, and reproduces the decoded data (i.e., functions as the image decoding apparatus according to an aspect of the present invention).

Furthermore, reader/recorder ex218 (i) reads and decodes the multiplexed data recorded on recording medium ex215, such as a DVD and a BD, or (i) encodes video signals in recording medium ex215, and in some cases, writes data obtained by multiplexing an audio signal on the encoded data. Reader/recorder ex218 can include the moving picture decoding apparatus or the moving picture encoding apparatus as shown in each of embodiments. In this case, the reproduced video signals are displayed on monitor ex219, and can be reproduced by another device or system using recording medium ex215 on which the multiplexed data is recorded. It is also possible to implement the moving picture decoding apparatus in set top box ex217 connected to cable ex203 for a cable television or to antenna ex204 for satellite and/or terrestrial broadcasting, so as to display the video signals on monitor ex219 of television ex300. The moving picture decoding apparatus may be implemented not in the set top box but in television ex300.

Figure 18:
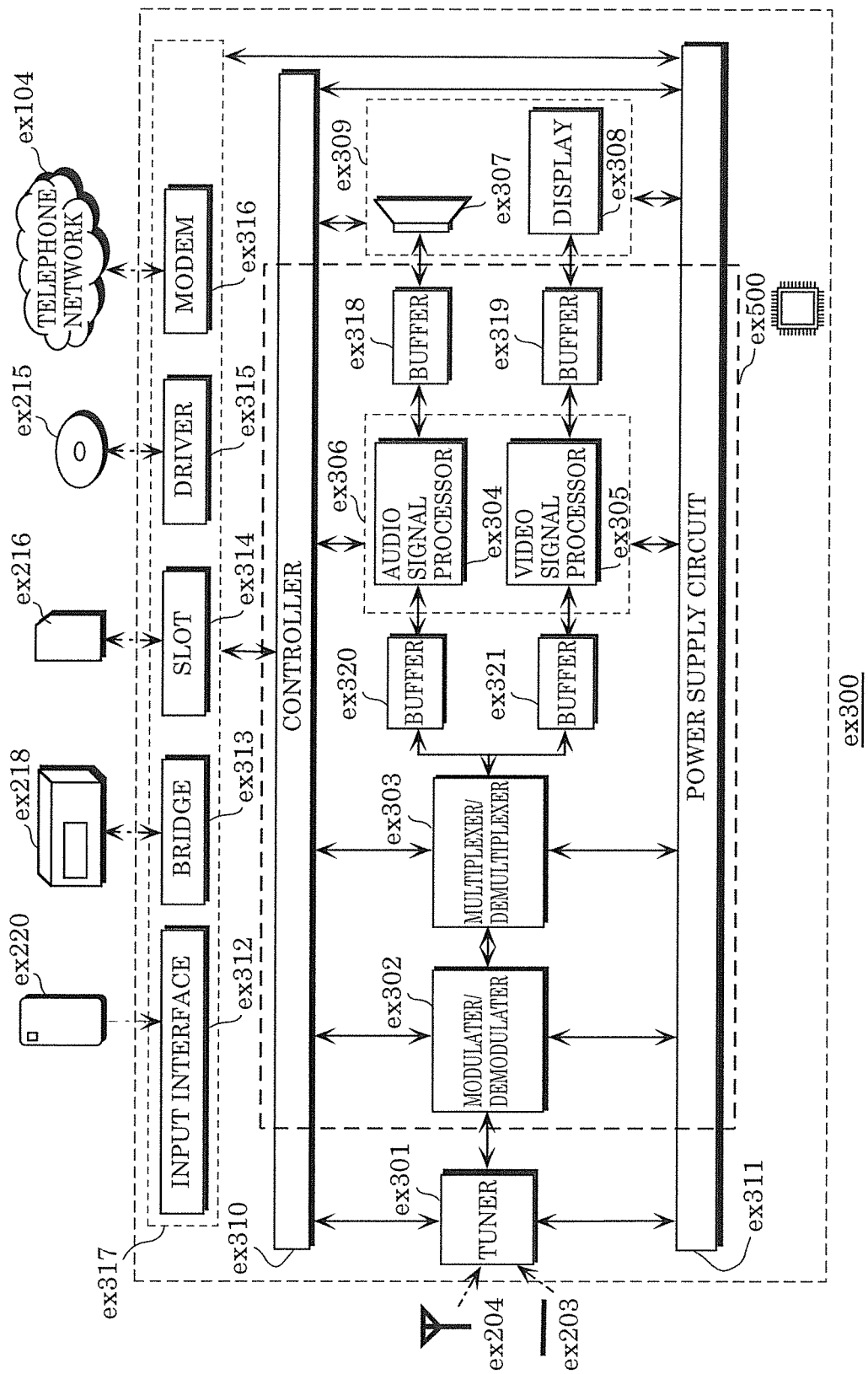
FIG. 18 shows a block diagram illustrating an example of a configuration of a television.

FIG. 18 illustrates television (receiver) ex300 that uses the moving picture encoding method and the moving picture decoding method described in each of embodiments. Television ex300 includes: tuner ex301 that obtains or provides multiplexed data obtained by multiplexing audio data onto video data, through antenna ex204 or cable ex203, etc. that receives a broadcast; modulater/demodulater ex302 that demodulates the received multiplexed data or modulates data into multiplexed data to be supplied outside; and multiplexer/demultiplexer ex303 that demultiplexes the modulated multiplexed data into video data and audio data, or multiplexes video data and audio data encoded by signal processor ex306 into data.

Television ex300 further includes; signal processor ex306 including audio signal processor ex304 and video signal processor ex305 that code each of audio data and video data, (which function as the image coding apparatus according to the aspects of the present invention); and output ex309 including speaker ex307 that provides the decoded audio signal, and display ex308 that displays the decoded video signal, such as a display. Furthermore, television ex300 includes interface ex317 including input interface ex312 that receives an input of a user operation. Furthermore, television ex300 includes controller ex310 that controls overall each constituent element of television ex300, and power supply circuit ex311 that supplies power to each of the elements. Other than input interface ex312, interface ex317 may include: bridge ex313 that is connected to an external device, such as reader/recorder ex218; slot ex314 for enabling attachment of recording medium ex216, such as an SD card; driver ex315 to be connected to an external recording medium, such as a hard disk; and modem ex316 to be connected to a telephone network. Here, recording medium ex216 can electrically record information using a non-volatile/volatile semiconductor memory element for storage. The constituent elements of television ex300 are connected to each other through a synchronous bus.

First, the configuration in which television ex300 decodes multiplexed data obtained from outside through antenna ex204 and others and reproduces the decoded data will be described. In television ex300, upon a user operation through remote controller ex220 and others, multiplexer/demultiplexer ex303 demultiplexes the multiplexed data demodulated by modulater/demodulater ex302, under control of controller ex310 including a CPU. Furthermore, audio signal processor ex304 decodes the demultiplexed audio data, and video signal processor ex305 decodes the demultiplexed video data, using the decoding method described in each of embodiments, in television ex300. Output ex309 provides the decoded video signal and audio signal outside, respectively. When output ex309 provides the video signal and the audio signal, the signals may be temporarily stored in buffers ex318 and ex319, and others so that the signals are reproduced in synchronization with each other. Furthermore, television ex300 may read multiplexed data not through a broadcast and others but from recording media ex215 and ex216, such as a magnetic disk, an optical disk, and a SD card. Next, a configuration in which television ex300 encodes an audio signal and a video signal, and transmits the data outside or writes the data on a recording medium will be described. In television ex300, upon a user operation through remote controller ex220 and others, audio signal processor ex304 encodes an audio signal, and video signal processor ex305 encodes a video signal, under control of controller ex310 using the encoding method described in each of embodiments. Multiplexer/demultiplexer ex303 multiplexes the encoded video signal and audio signal, and provides the resulting signal outside. When multiplexer/demultiplexer ex303 multiplexes the video signal and the audio signal, the signals may be temporarily stored in buffers ex320 and ex321, and others so that the signals are reproduced in synchronization with each other. Here, buffers ex318, ex319, ex320, and ex321 may be plural as illustrated, or at least one buffer may be shared in television ex300. Furthermore, data may be stored in a buffer so that the system overflow and underflow may be avoided between modulater/demodulater ex302 and multiplexer/demultiplexer ex303, for example.

Furthermore, television ex300 may include a configuration for receiving an AV input from a microphone or a camera other than the configuration for obtaining audio and video data from a broadcast or a recording medium, and may encode the obtained data. Although television ex300 can encode, multiplex, and provide outside data in the description, it may be capable of only receiving, decoding, and providing outside data but not the encoding, multiplexing, and providing outside data.

Furthermore, when reader/recorder ex218 reads or writes multiplexed data from or on a recording medium, one of television ex300 and reader/recorder ex218 may code the multiplexed data, and television ex300 and reader/recorder ex218 may share the coding partly.

Figure 19:
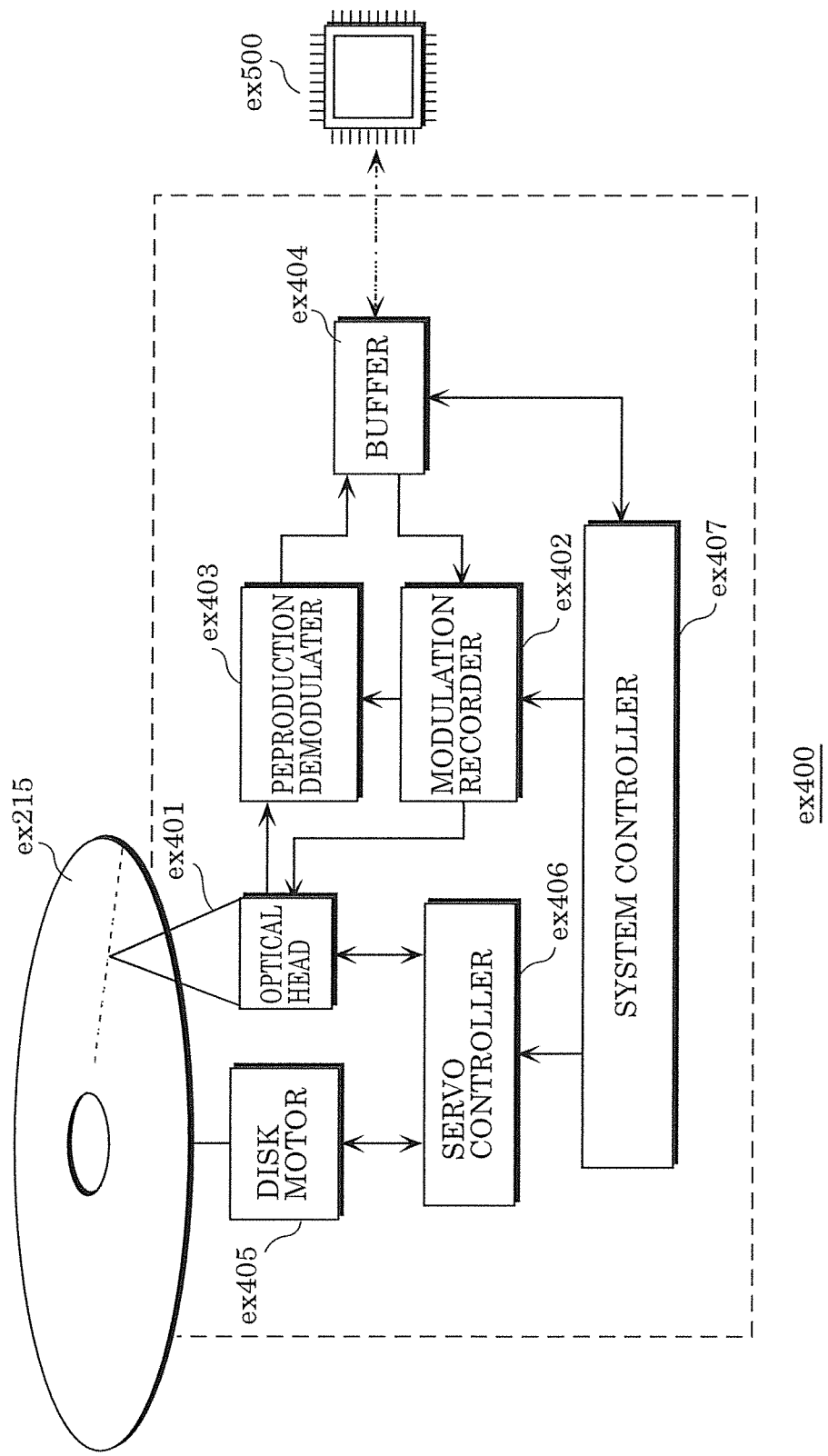
FIG. 19 shows a block diagram illustrating an example of a configuration of an information reproducer/recorder that reads and writes information from and on a recording medium that is an optical disk.

As an example, FIG. 19 illustrates a configuration of information reproducer/recorder ex400 when data is read or written from or on an optical disk. Information reproducer/recorder ex400 includes constituent elements ex401, ex402, ex403, ex404, ex405, ex406, and ex407 to be described hereinafter. Optical head ex401 irradiates a laser spot in a recording surface of recording medium ex215 that is an optical disk to write information, and detects reflected light from the recording surface of recording medium ex215 to read the information. Modulation recorder ex402 electrically drives a semiconductor laser included in optical head ex401, and modulates the laser light according to recorded data. Reproduction demodulater ex403 amplifies a reproduction signal obtained by electrically detecting the reflected light from the recording surface using a photo detector included in optical head ex401, and demodulates the reproduction signal by separating a signal component recorded on recording medium ex215 to reproduce the necessary information. Buffer ex404 temporarily holds the information to be recorded on recording medium ex215 and the information reproduced from recording medium ex215. Disk motor ex405 rotates recording medium ex215. Servo controller ex406 moves optical head ex401 to a predetermined information track while controlling the rotation drive of disk motor ex405 so as to follow the laser spot. System controller ex407 controls overall information reproducer/recorder ex400. The reading and writing processes can be implemented by system controller ex407 using various information stored in buffer ex404 and generating and adding new information as necessary, and by modulation recorder ex402, reproduction demodulater ex403, and servo controller ex406 that record and reproduce information through optical head ex401 while being operated in a coordinated manner. System controller ex407 includes, for example, a microprocessor, and executes processing by causing a computer to execute a program for read and write.

Although optical head ex401 irradiates a laser spot in the description, it may perform high-density recording using near field light.

Figure 20:
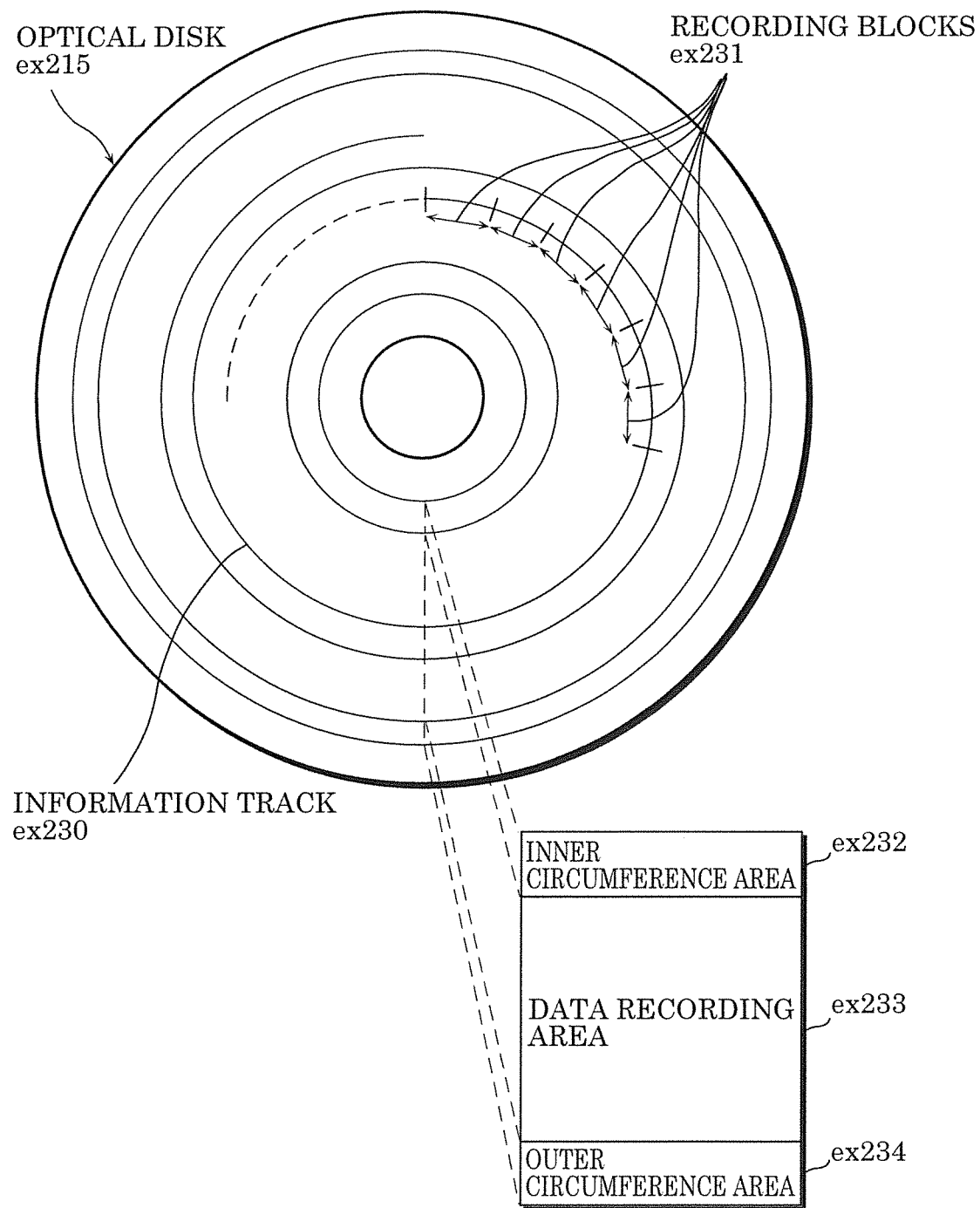
FIG. 20 shows an example of a configuration of a recording medium that is an optical disk.

FIG. 20 illustrates recording medium ex215 that is the optical disk. On the recording surface of recording medium ex215, guide grooves are spirally formed, and information track ex230 records, in advance, address information indicating an absolute position on the disk according to change in a shape of the guide grooves. The address information includes information for determining positions of recording blocks ex231 that are a unit for recording data. Reproducing information track ex230 and reading the address information in an apparatus that records and reproduces data can lead to determination of the positions of the recording blocks. Furthermore, recording medium ex215 includes data recording area ex233, inner circumference area ex232, and outer circumference area ex234. Data recording area ex233 is an area for use in recording the user data. Inner circumference area ex232 and outer circumference area ex234 that are inside and outside of data recording area ex233, respectively are for specific use except for recording the user data. Information reproducer/recorder 400 reads and writes encoded audio, encoded video data, or multiplexed data obtained by multiplexing the encoded audio and video data, from and on data recording area ex233 of recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, car ex210 having antenna ex205 can receive data from satellite ex202 and others, and reproduce video on a display device such as car navigation system ex211 set in car ex210, in digital broadcasting system ex200. Here, a configuration of car navigation system ex211 will be a configuration, for example, including a GPS receiver from the configuration illustrated in FIG. 18. The same will be true for the configuration of computer ex111, cellular phone ex114, and others.

Figure 21A:
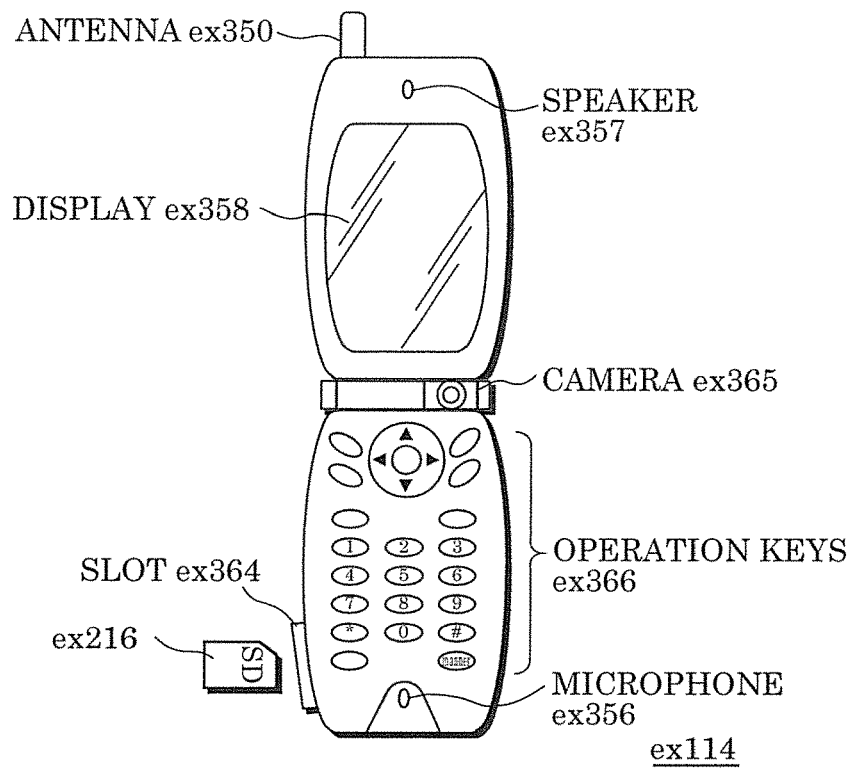
FIG. 21A shows an example of a cellular phone.

FIG. 21A illustrates cellular phone ex114 that uses the moving picture coding method described in embodiments. Cellular phone ex114 includes: antenna ex350 for transmitting and receiving radio waves through base station ex110; camera ex365 capable of capturing moving and still images; and display ex358 such as a liquid crystal display for displaying the data such as decoded video captured by camera ex365 or received by antenna ex350. Cellular phone ex114 further includes: a main body including operation keys ex366; speaker ex357 such as a speaker for output of audio; microphone ex356 such as a microphone for input of audio; memory ex367 for storing captured video or still pictures, recorded audio, coded data of the received video, the still pictures, e-mails, or others; and slot ex364 that is an interface for a recording medium that stores data in the same manner as memory ex367.

Figure 21B:
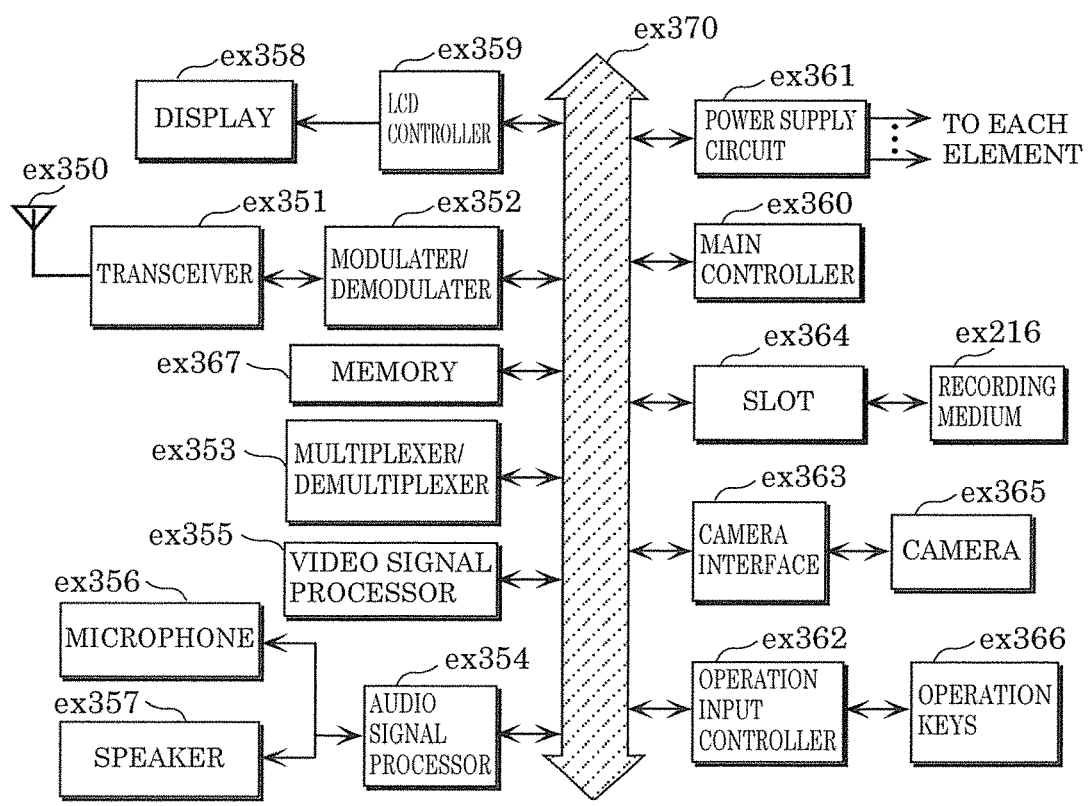
FIG. 21B is a block diagram showing an example of a configuration of a cellular phone.

Next, an example of a configuration of cellular phone ex114 will be described with reference to FIG. 21B. In cellular phone ex114, main controller ex360 designed to control overall each unit of the main body including display ex358 as well as operation keys ex366 is connected mutually, via synchronous bus ex370, to power supply circuit ex361, operation input controller ex362, video signal processor ex355, camera interface ex363, liquid crystal display (LCD) controller ex359, modulater/demodulater ex352, multiplexer/demultiplexer ex353, audio signal processor ex354, slot ex364, and memory ex367.

When a call-end key or a power key is turned ON by a user's operation, power supply circuit ex361 supplies the respective elements with power from a battery pack so as to activate cell phone ex114.

In cellular phone ex114, audio signal processor ex354 converts the audio signals collected by microphone ex356 in voice conversation mode into digital audio signals under the control of main controller ex360 including a CPU, ROM, and RAM. Then, modulater/demodulater ex352 performs spread spectrum processing on the digital audio signals, and transceiver ex351 performs digital-to-analog conversion and frequency conversion on the data, so as to transmit the resulting data via antenna ex350. Also, in cellular phone ex114, transceiver ex351 amplifies the data received by antenna ex350 in voice conversation mode and performs frequency conversion and the analog-to-digital conversion on the data. Then, modulater/demodulater ex352 performs inverse spread spectrum processing on the data, and audio signal processor ex354 converts it into analog audio signals, so as to output them via speaker ex357.

Furthermore, when an e-mail in data communication mode is transmitted, text data of the e-mail inputted by operating operation keys ex366 and others of the main body is sent out to main controller ex360 via operation input controller ex362. Main controller ex360 causes modulater/demodulater ex352 to perform spread spectrum processing on the text data, and transceiver ex351 performs the digital-to-analog conversion and the frequency conversion on the resulting data to transmit the data to base station ex110 via antenna ex350. When an e-mail is received, processing that is approximately inverse to the processing for transmitting an e-mail is performed on the received data, and the resulting data is provided to display ex358.

When video, still images, or video and audio in data communication mode is or are transmitted, video signal processor ex355 compresses and encodes video signals supplied from camera ex365 using the moving picture encoding method shown in each of embodiments (i.e., functions as the image encoding apparatus according to the aspect of the present invention), and transmits the encoded video data to multiplexer/demultiplexer ex353. In contrast, during when camera ex365 captures video, still images, and others, audio signal processor ex354 encodes audio signals collected by microphone ex356, and transmits the encoded audio data to multiplexer/demultiplexer ex353.

Multiplexer/demultiplexer ex353 multiplexes the encoded video data supplied from video signal processor ex355 and the encoded audio data supplied from audio signal processor ex354, using a predetermined method. Then, modulater/demodulater (modulation/demodulation circuit) ex352 performs spread spectrum processing on the multiplexed data, and transceiver ex351 performs digital-to-analog conversion and frequency conversion on the data so as to transmit the resulting data via antenna ex350.

When receiving data of a video file which is linked to a Web page and others in data communication mode or when receiving an e-mail with video and/or audio attached, in order to decode the multiplexed data received via antenna ex350, multiplexer/demultiplexer ex353 demultiplexes the multiplexed data into a video data bit stream and an audio data bit stream, and supplies video signal processor ex355 with the encoded video data and audio signal processor ex354 with the encoded audio data, through synchronous bus ex370. Video signal processor ex355 decodes the video signal using a moving picture decoding method corresponding to the moving picture encoding method shown in each of embodiments (i.e., functions as the image decoding apparatus according to the aspect of the present invention), and then display ex358 displays, for instance, the video and still images included in the video file linked to the Web page via LCD controller ex359. Furthermore, audio signal processor ex354 decodes the audio signal, and speaker ex357 provides the audio.

Furthermore, similarly to television ex300, a terminal such as cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
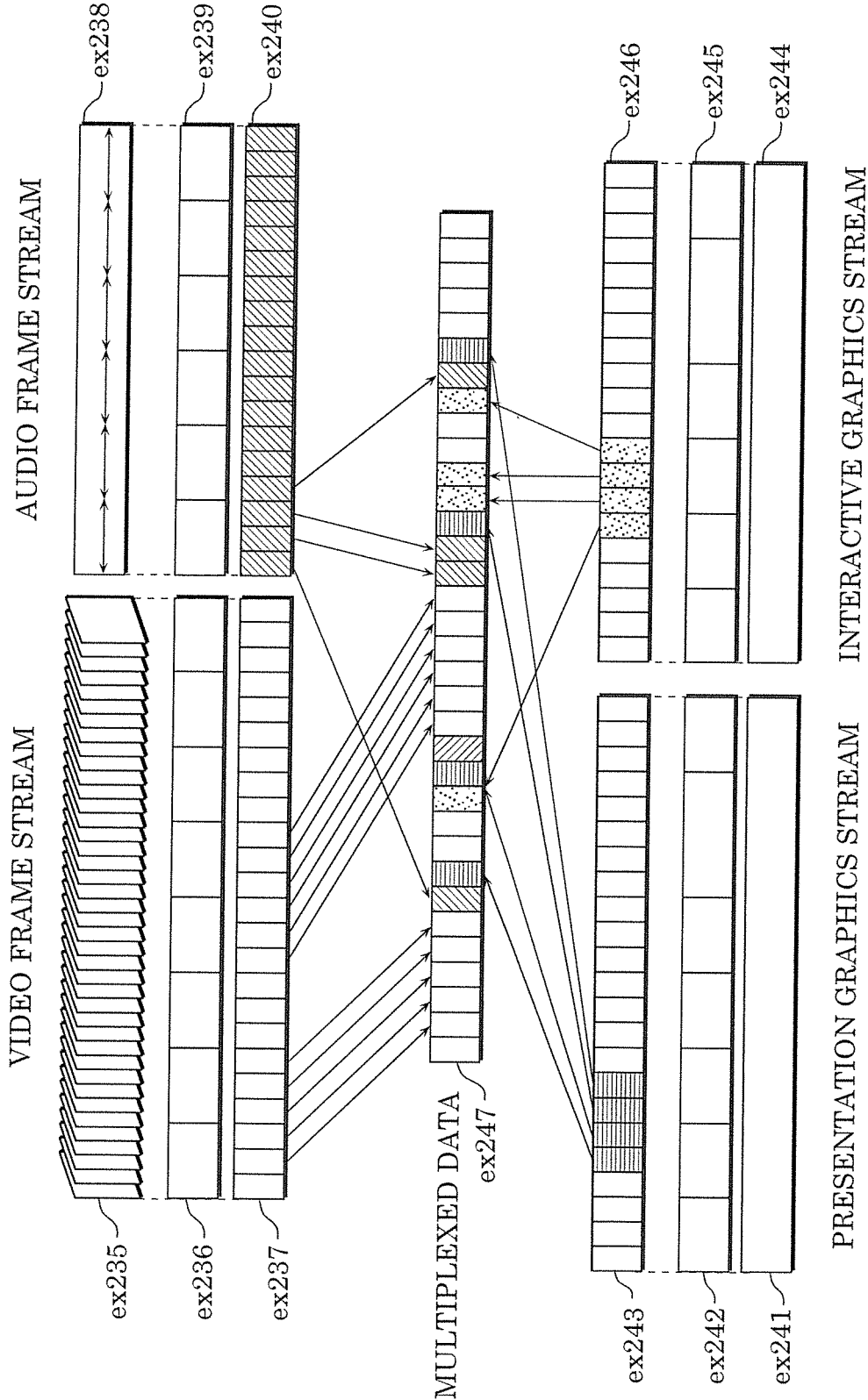
FIG. 23 schematically shows how each stream is multiplexed in multiplexed data.

FIG. 23 schematically illustrates how data is multiplexed. First, video stream ex235 composed of video frames and audio stream ex238 composed of audio frames are transformed into a stream of PES packets ex236 and a stream of PES packets ex239, and further into TS packets ex237 and TS packets ex240, respectively. Similarly, data of presentation graphics stream ex241 and data of interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
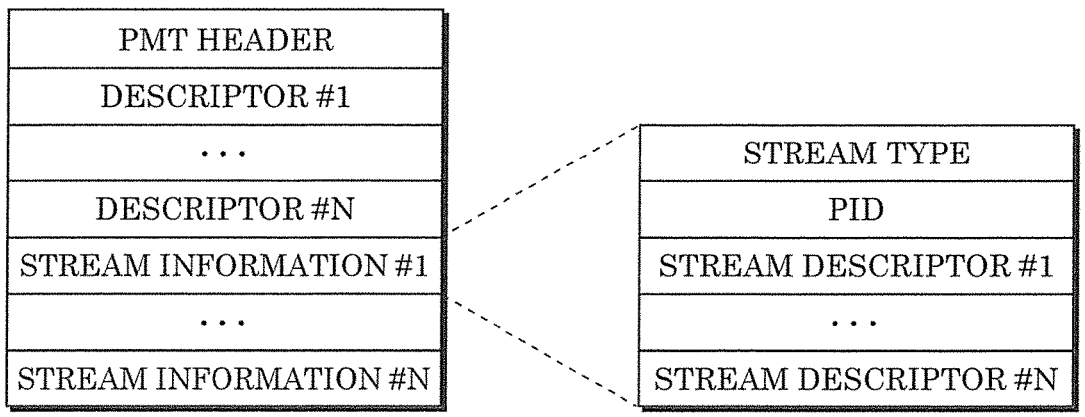
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
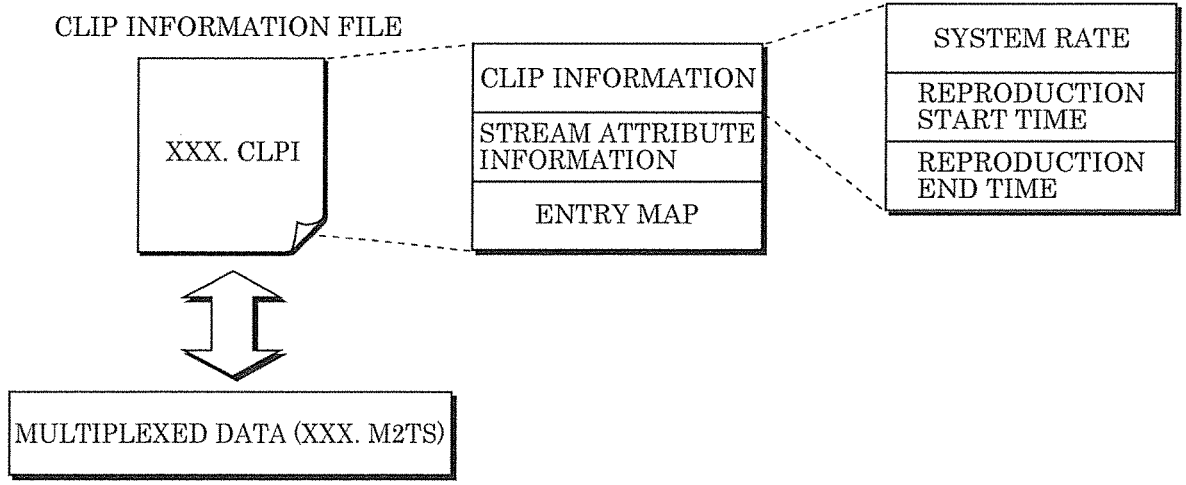
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
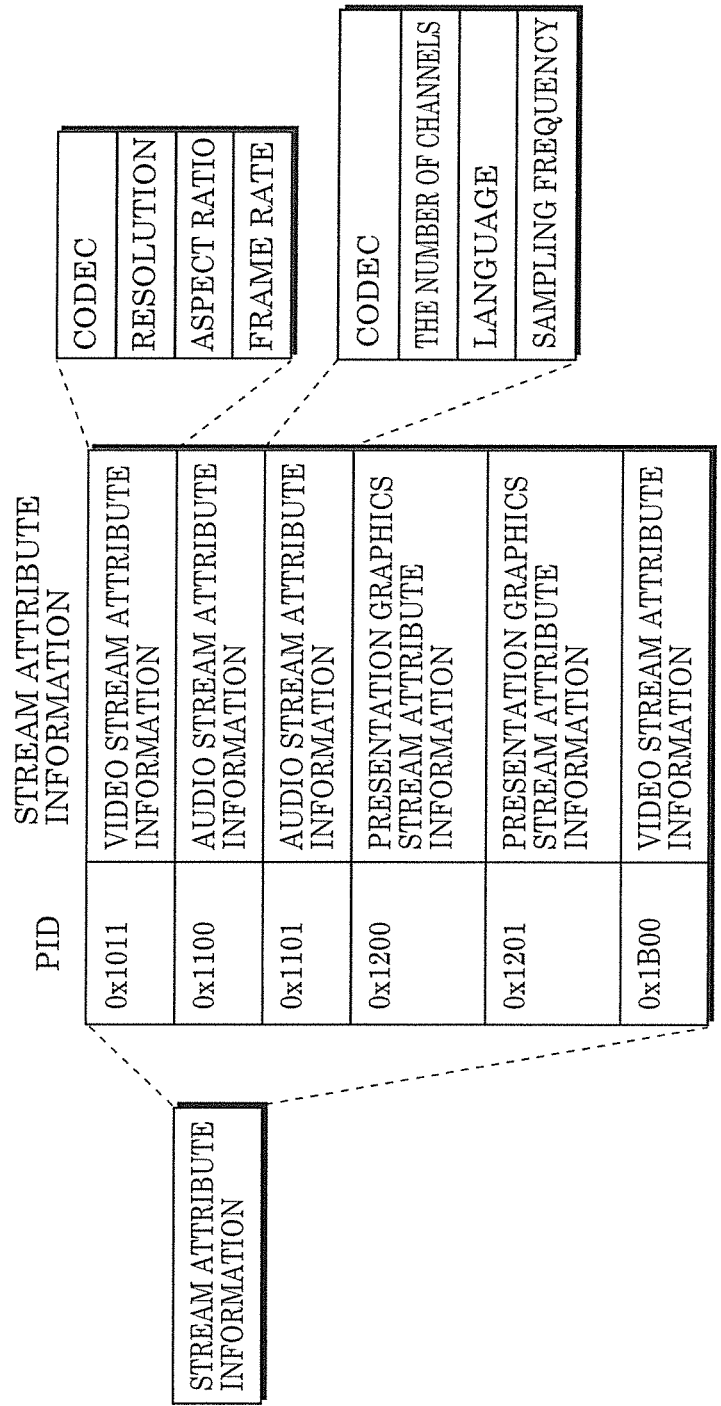
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or an element for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 29:
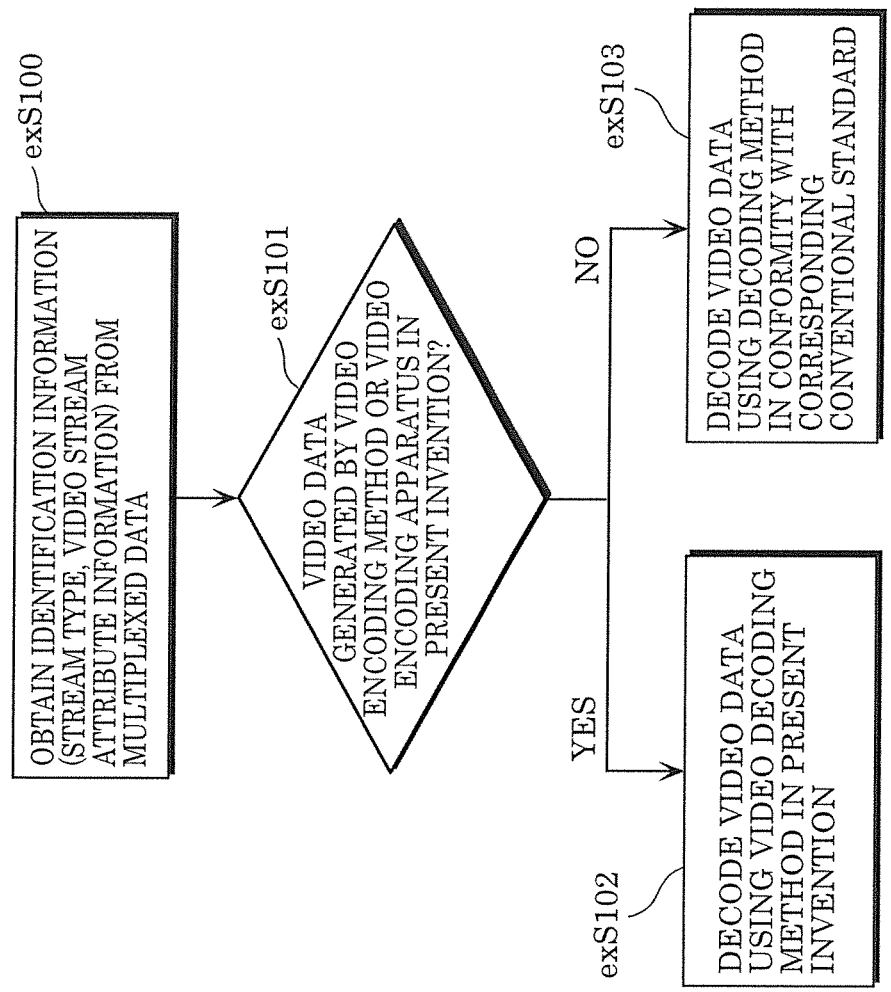
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 30:
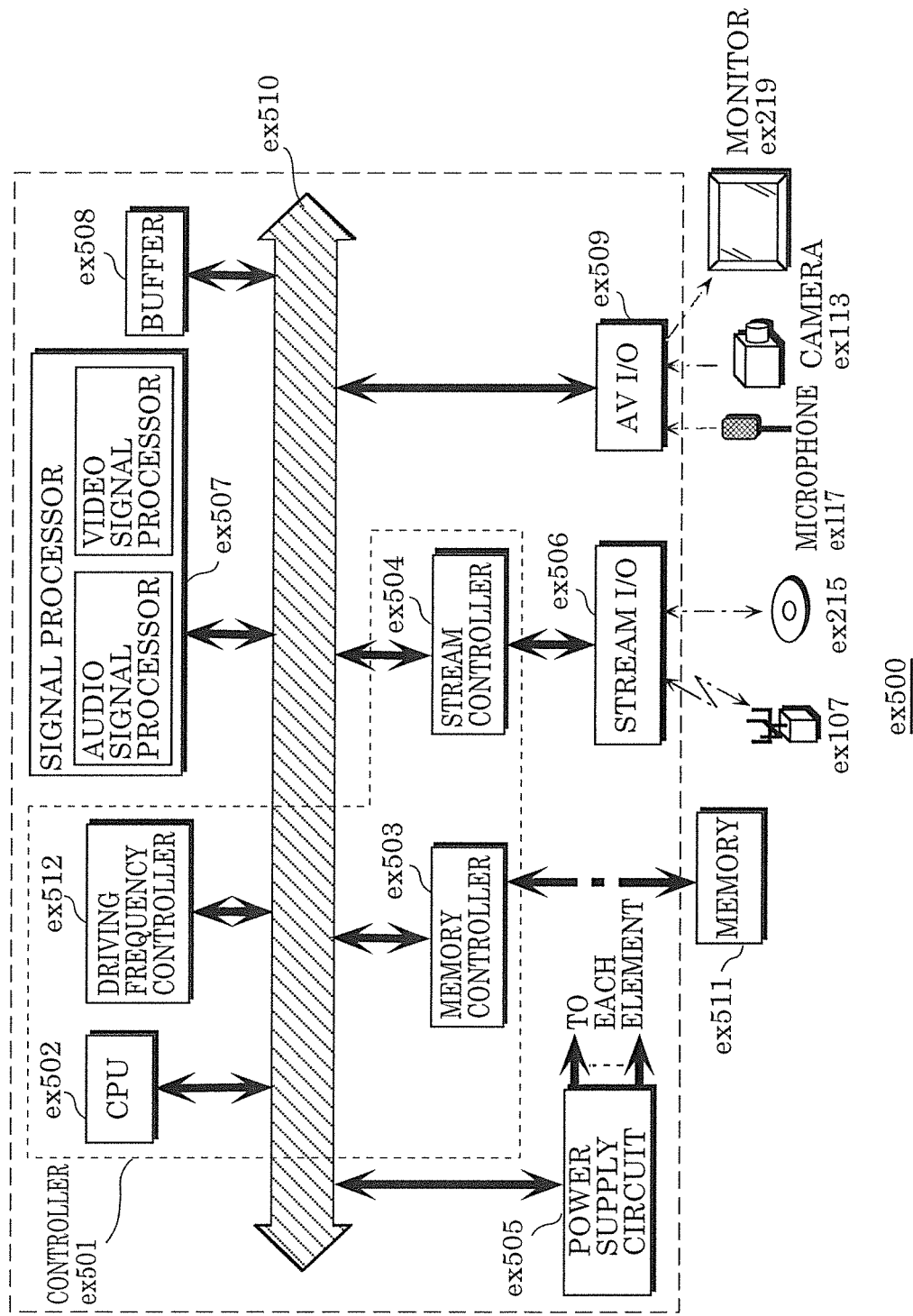
FIG. 30 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 30 illustrates a configuration of LSI ex500 that is made into one chip. LSI ex500 includes elements ex501, ex502, ex503, ex504, ex505, ex506, ex507, ex508, and ex509 to be described below, and the elements are connected to each other through bus ex510. Power supply circuit ex505 is activated by supplying each of the elements with power when power supply circuit ex505 is turned on.

For example, when encoding is performed, LSI ex500 receives an AV signal from microphone ex117, camera ex113, and others through AV IO ex509 under control of controller ex501 including CPU ex502, memory controller ex503, stream controller ex504, and driving frequency controller ex512. The received AV signal is temporarily stored in external memory ex511, such as an SDRAM. Under control of controller ex501, the stored data is segmented into data portions according to the processing amount and speed to be transmitted to signal processor ex507. Then, signal processor ex507 encodes an audio signal and/or a video signal. Here, the encoding of the video signal is the encoding described in each of embodiments. Furthermore, signal processor ex507 sometimes multiplexes the encoded audio data and the encoded video data, and stream IO ex506 provides the multiplexed data outside. The provided multiplexed data is transmitted to base station ex107, or written on recording medium ex215. When data sets are multiplexed, the data should be temporarily stored in buffer ex508 so that the data sets are synchronized with each other.

Although memory ex511 is an element outside LSI ex500, it may be included in LSI ex500. Buffer ex508 is not limited to one buffer, but may be composed of buffers. Furthermore, LSI ex500 may be made into one chip or a plurality of chips.

Furthermore, although controller ex501 includes CPU ex502, memory controller ex503, stream controller ex504, driving frequency controller ex512, configuration of controller ex501 is not limited to such. For example, signal processor ex507 may further include a CPU. Inclusion of another CPU in signal processor ex507 can improve the processing speed. Furthermore, as another example, CPU ex502 may serve as or be a part of signal processor ex507, and, for example, may include an audio signal processor. In such a case, controller ex501 includes signal processor ex507 or CPU ex502 including a part of signal processor ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, LSI ex500 needs to be set to a driving frequency higher than that of CPU ex502 to be used when video data in conformity with the conventional standard is decoded. However, there is a problem that the power consumption increases when the driving frequency is set higher.

Figure 31:
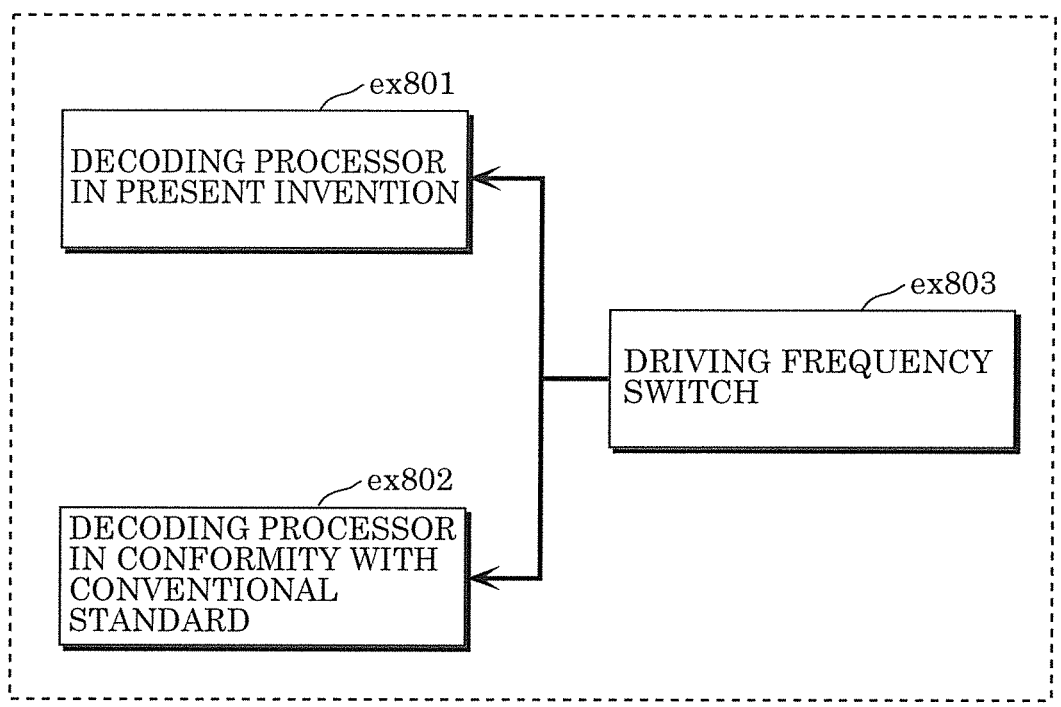
FIG. 31 shows a configuration for switching between driving frequencies.

In order to solve the problem, the moving picture decoding apparatus, such as television ex300 and LSI ex500 is configured to determine to which standard the video data conforms, and switch between the driving frequencies according to the determined standard. FIG. 31 illustrates configuration ex800 in the present embodiment. Driving frequency switch ex803 sets a driving frequency to a higher driving frequency when video data is generated by the moving picture encoding method or the moving picture encoding apparatus described in each of embodiments. Then, driving frequency switch ex803 instructs decoding processor ex801 that executes the moving picture decoding method described in each of embodiments to decode the video data. When the video data conforms to the conventional standard, driving frequency switch ex803 sets a driving frequency to a lower driving frequency than that of the video data generated by the moving picture encoding method or the moving picture encoding apparatus described in each of embodiments. Then, driving frequency switch ex803 instructs decoding processor ex802 that conforms to the conventional standard to decode the video data.

More specifically, driving frequency switch ex803 includes CPU ex502 and driving frequency controller ex512 in FIG. 30. Here, each of decoding processor ex801 that executes the moving picture decoding method described in each of embodiments and decoding processor ex802 that conforms to the conventional standard corresponds to signal processor ex507 in FIG. 30. CPU ex502 determines to which standard the video data conforms. Then, driving frequency controller ex512 determines a driving frequency based on a signal from CPU ex502. Furthermore, signal processor ex507 decodes the video data based on the signal from CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, CPU ex502 selects a driving frequency based on, for example, a look-up table in which the standards of the video data are associated with the driving frequencies as shown in FIG. 33. The driving frequency can be selected by storing the look-up table in buffer ex508 and in an internal memory of an LSI, and with reference to the look-up table by CPU ex502.

Figure 32:
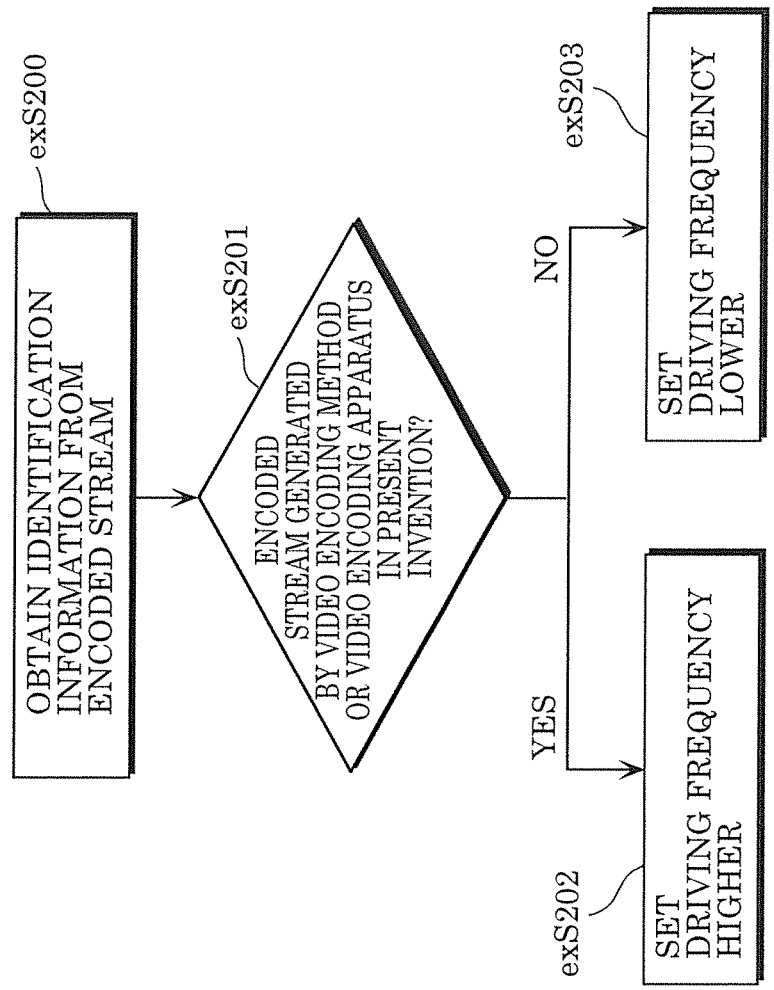
FIG. 32 shows steps for identifying video data and switching between driving frequencies.

FIG. 32 illustrates steps for executing a method in the present embodiment. First, in Step exS200, signal processor ex507 obtains identification information from the multiplexed data. Next, in Step exS201, CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, CPU ex502 transmits a signal for setting the driving frequency to a higher driving frequency to driving frequency controller ex512. Then, driving frequency controller ex512 sets the driving frequency to the higher driving frequency. On the other hand, when the identification information indicates that the video data conforms to the conventional standard, such as MPEG-2, MPEG-4 AVC, and VC-1, in Step exS203, CPU ex502 transmits a signal for setting the driving frequency to a lower driving frequency to driving frequency controller ex512. Then, driving frequency controller ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to LSI ex500 or an apparatus including LSI ex500. For example, when the driving frequency is set lower, the voltage to be applied to LSI ex500 or the apparatus including LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to LSI ex500 or the apparatus including LSI ex500 is probably set higher. When the identification information indicates that the video data conforms to the conventional standard, such as MPEG-2, MPEG-4 AVC, and VC-1, the voltage to be applied to LSI ex500 or the apparatus including LSI ex500 is probably set lower. As another example, when the identification information indicates that the video data is generated by the moving picture encoding method and the moving picture encoding apparatus described in each of embodiments, the driving of CPU ex502 does not probably have to be suspended. When the identification information indicates that the video data conforms to the conventional standard, such as MPEG-2, MPEG-4 AVC, and VC-1, the driving of CPU ex502 is probably suspended at a given time because CPU ex502 has extra processing capacity. Even when the identification information indicates that the video data is generated by the moving picture encoding method and the moving picture encoding apparatus described in each of embodiments, in the case where CPU ex502 has extra processing capacity, the driving of CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when LSI ex500 or the apparatus including LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, signal processor ex507 of LSI ex500 needs to conform to the different standards. However, the problems of increase in the scale of the circuit of LSI ex500 and increase in the cost arise with the individual use of signal processors ex507 that conform to the respective standards.

In order to solve the problem, what is conceived is a configuration in which the decoding processor for implementing the moving picture decoding method described in each of embodiments and the decoding processor that conforms to the conventional standard, such as MPEG-2, MPEG-4 AVC, and VC-1 are partly common. Ex900 in FIG. 34A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be common probably include use of decoding processor ex902 that conforms to MPEG-4 AVC. In contrast, unique decoding processor ex901 is probably used for other processing which is unique to an aspect of the present invention and does not conform to MPEG-4 AVC. Since the aspect of the present invention is characterized by inverse quantization in particular, for example, unique decoding processor ex901 is used for inverse quantization. Otherwise, the decoding processor is probably common for one of the entropy decoding, deblocking filtering, and motion compensation, or all of the processing. The decoding processor for implementing the moving picture decoding method described in each of embodiments may be common for the processing to be common, and a dedicated decoding processor may be used for processing unique to that of MPEG-4 AVC.

Furthermore, ex1000 in FIG. 34B shows another example in that processing is partly common. This example uses a configuration including unique decoding processor ex1001 that supports the processing unique to an aspect of the present invention, unique decoding processor ex1002 that supports the processing unique to another conventional standard, and decoding processor ex1003 that supports processing to be common between the moving picture decoding method according to the aspect of the present invention and the conventional moving picture decoding method. Here, unique decoding processors ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by LSI ex500.

As such, reducing the scale of the circuit of an LSI and reducing the cost are possible by sharing the decoding processor for the processing to be common between the moving picture decoding method according to the aspect of the present invention and the moving picture decoding method in conformity with the conventional standard.

INDUSTRIAL APPLICABILITY

The present disclosure is applicable to, for example, video encoding apparatuses and decoding apparatuses which use quantization matrices, and specifically to, for example, television receivers, digital cameras, smartphones, net distribution systems, etc.

REFERENCE MARKS IN THE DRAWINGS 10, 2000 encoding apparatus
11 setter
12, 2020 quantizer
13 encoder
20, 4000 decoding apparatus
21 decoder
22 setter
23, 4010 inverse quantizer
2025 variable length encoder (encoder)
2030, 4025 quantization matrix switch (setter)
3005 quantization matrix switching controller
3010 custom/defined switch
3015 defined matrix selector
3020 memory
4005 variable length decoder (decoder)

The invention claimed is:
1. A decoding method for decoding an encoded video on a per block basis, the decoding method comprising:
   decoding, for each of predetermined units of the encoded video, in a mutually associated manner, a target block which is subjected to a dequantization and identification information for identifying a quantization matrix set to be used to perform the dequantization on the target block, the quantization matrix set including a plurality of quantization matrices; and
   performing the dequantization on the target block using a quantization matrix selected from the quantization matrix set which has been identified by the identification information,
   wherein, when encoding a video to generate the encoded video:
      a quantization matrix set is selected, for each of the predetermined units of the video, from (i) an arbitrary quantization matrix set which is arbitrarily specified and is encoded and (ii) a plurality of default quantization matrix sets which have been respectively defined in advance, are not encoded, and are not included in a bitstream, and the selected quantization matrix set is set as the quantization matrix set to be used to perform quantization on a target block which is subjected to a quantization;
      each of the plurality of default quantization matrix sets includes at least a first quantization matrix for inter prediction and a second quantization matrix different from the first quantization matrix; and
      when the quantization matrix set which has been set is the arbitrary quantization matrix set, the arbitrary quantization matrix set is encoded, and
   when the plurality of default quantization matrix sets include a first set and a second set, respectively, as default quantization matrix sets,
      a first quantization matrix in the first set is different from a second quantization matrix in the second set, the first quantization matrix and the second quantization matrix corresponding to a same block size.

2. The decoding method according to claim 1,
   wherein in the performing of dequantization,
      a quantization matrix suitable for a size of the target block is selected from the quantization matrix set which is identified by the identification information, and the dequantization is performed using the quantization matrix which has been selected.

3. The decoding method according to claim 2, wherein quantization values each corresponding to a same high frequency vary between a quantization matrix included in the first set and suitable for the size of the target block and a quantization matrix included in the second set and suitable for the size of the target block.

4. The decoding method according to claim 1,
   wherein in the encoding:
      whether the arbitrary quantization matrix set is used or not is determined;
      either the arbitrary quantization matrix set or any one of the plurality of default quantization matrix sets is selected based on a result of the determination, as the quantization matrix set to be used to perform the quantization on the target block; and
      switching information indicating the result of the determination is encoded as at least part of the identification information.

5. The decoding method according to claim 1,
   wherein in the encoding,
      a quantization matrix set is selected from the plurality of default quantization matrix sets according to priority ranks assigned respectively to the plurality of default quantization matrix sets.

6. The decoding method according to claim 5, further comprising
   changing the priority ranks assigned respectively to the plurality of default quantization matrix sets.

7. The decoding method according to claim 1,
wherein each of the arbitrary quantization matrix set and the plurality of default quantization matrix sets includes at least a quantization matrix suitable for a first prediction mode and a quantization matrix suitable for a second prediction mode.

8. A decoding apparatus for decoding an encoded video on a per block basis, the decoding apparatus comprising:
a decoder that decodes, in a mutually associated manner, a target block which has been subjected to a dequantization and identification information for identifying a quantization matrix set to be used to perform the dequantization on the target block, the quantization matrix set including a plurality of quantization matrices; and
a dequantizer that performs the dequantization on the target block using a quantization matrix selected from the quantization matrix set which has been identified by the identification information,
wherein, when encoding a video to generate the encoded video:
a quantization matrix set is selected, for each of the predetermined units of the video, from (i) an arbitrary quantization matrix set which is arbitrarily specified and is encoded and (ii) a plurality of default quantization matrix sets which have been respectively defined in advance, are not encoded, and are not included in a bitstream, and the selected quantization matrix set is set as the quantization matrix set to be used to perform quantization on a target block which is subjected to a quantization;
each of the plurality of default quantization matrix sets includes at least a first quantization matrix for inter prediction and a second quantization matrix different from the first quantization matrix; and
when the quantization matrix set which has been set is the arbitrary quantization matrix set, the arbitrary quantization matrix set is encoded, and
when the plurality of default quantization matrix sets include a first set and a second set, respectively, as default quantization matrix sets,
a first quantization matrix in the first set is different from a second quantization matrix in the second set, the first quantization matrix and the second quantization matrix corresponding to a same block size.

9. A decoding apparatus for decoding an encoded video on a per block basis, the decoding apparatus comprising:
a processing circuit; and
storage which is electrically connected to the processing circuit,
wherein the processing circuit executes:
decoding, in a mutually associated manner, a target block which has been subjected to a dequantization and identification information for identifying a quantization matrix set to be used to perform the dequantization on the target block, the quantization matrix set including a plurality of quantization matrices; and
performing the dequantization on the target block using a quantization matrix selected from the quantization matrix set which has been identified by the identification information,
when encoding a video to generate the encoded video:
a quantization matrix set is selected, for each of the predetermined units of the video, from (i) an arbitrary quantization matrix set which is arbitrarily specified and is encoded and (ii) a plurality of default quantization matrix sets which have been respectively defined in advance, are not encoded, and are not included in a bitstream, and the selected quantization matrix set is set as the quantization matrix set to be used to perform quantization on a target block which is subjected to a quantization;
each of the plurality of default quantization matrix sets includes at least a first quantization matrix for inter prediction and a second quantization matrix different from the first quantization matrix; and
when the quantization matrix set which has been set is the arbitrary quantization matrix set, the arbitrary quantization matrix set is encoded, and
when the plurality of default quantization matrix sets include a first set and a second set, respectively, as default quantization matrix sets,
a first quantization matrix in the first set is different from a second quantization matrix in the second set, the first quantization matrix and the second quantization matrix corresponding to a same block size.

10. A decoding method for decoding an encoded video on a per block basis, the decoding method comprising:
decoding, in a mutually associated manner, a target block which has been subjected to a dequantization and identification information for identifying a quantization matrix set to be used to perform the dequantization on the target block, the quantization matrix set including a plurality of quantization matrices; and
performing the dequantization on the target block using a quantization matrix selected from the quantization matrix set which has been identified by the identification information,
wherein, when encoding a video to generate the encoded video:
a quantization matrix set is selected from a plurality of quantization matrix sets which have been respectively defined in advance, are not encoded, and are not included in a bitstream, and the selected quantization matrix set is set as the quantization matrix set to be used to perform the quantization on the target block; and
each of the plurality of quantization matrix sets includes a quantization matrix having quantization values different from quantization values of a quantization matrix included in any other one of the plurality of second quantization matrix sets, and
when the plurality of quantization matrix sets include a first set and a second set, respectively, as quantization matrix sets,
a first quantization matrix in the first set is different from a second quantization matrix in the second set, the first quantization matrix and the second quantization matrix corresponding to a same block size.

* * * * *